US012743184B2

(12) United States Patent
Gutknecht et al.

(10) Patent No.: US 12,743,184 B2
(45) Date of Patent: Sep. 22, 2026

(54) USER INTERFACE MODES FOR THREE-DIMENSIONAL DISPLAY

(71) Applicant: Apple Inc., Cupertino, CA (US)

(72) Inventors: Olivier Gutknecht, San Francisco, CA (US); Peter L. Hajas, Lafayette, CO (US); Raffael Hannemann, Paris (FR); Michael E. Buerli, San Francisco, CA (US); Mark L. Ma, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 209 days.

(21) Appl. No.: 18/125,112

(22) Filed: Mar. 22, 2023

(65) Prior Publication Data

US 2023/0221830 A1 Jul. 13, 2023

Related U.S. Application Data

(63) Continuation of application No. 17/992,887, filed on Nov. 22, 2022, now abandoned.

(60) Provisional application No. 63/285,470, filed on Dec. 2, 2021.

(51) Int. Cl.

| | |
|---|---|
| ***G06F 3/04815*** | (2022.01) |
| ***G06F 3/01*** | (2006.01) |
| ***G06F 3/04847*** | (2022.01) |
| ***G06T 19/00*** | (2011.01) |

(52) U.S. Cl.

CPC .......... *G06F 3/04815* (2013.01); *G06F 3/017* (2013.01); *G06F 3/04847* (2013.01); *G06T 19/003* (2013.01); *G06T 19/006* (2013.01); *G06T 2200/24* (2013.01)

(58) Field of Classification Search

None

See application file for complete search history.

(56) References Cited

U.S. PATENT DOCUMENTS

| | | | | |
|---|---|---|---|---|
| 10,026,231 | B1 * | 7/2018 | Gribetz | G02B 27/0093 |
| 10,754,416 | B2 * | 8/2020 | Harvey | G06F 3/017 |
| 10,854,169 | B2 * | 12/2020 | Estruch Tena | G06F 3/017 |
| 10,990,240 | B1 * | 4/2021 | Ravasz | G06F 3/011 |
| 11,126,320 | B1 * | 9/2021 | Thompson | G06F 3/0482 |
| 11,402,871 | B1 * | 8/2022 | Berliner | G06T 19/006 |
| 11,514,656 | B2 * | 11/2022 | Berliner | G06F 1/163 |

(Continued)

FOREIGN PATENT DOCUMENTS

| | | |
|---|---|---|
| KR | 10-2016-0148558 | 12/2016 |
| WO | WO 2015/168041 | 11/2015 |

OTHER PUBLICATIONS

International Search Report and Written Opinion from PCT/US2022/051572, dated Apr. 4, 2023, 14 pages.

(Continued)

*Primary Examiner* — Jason A Pringle-Parker

(74) *Attorney, Agent, or Firm* — BAKERHOSTETLER

(57) ABSTRACT

Aspects of the subject technology provide for various user interface modes for a user interface of an application. The user interface modes may include one or more bounded modes, a single application mode such as an exclusive mode, and/or one or more full screen modes. In one or more implementations, access to various types of information by the application may be constrained based on the user interface mode of the user interface.

23 Claims, 17 Drawing Sheets

(56) References Cited

U.S. PATENT DOCUMENTS

2008/0005702 A1* 1/2008 Skourup ................. G06F 3/011 715/848
2011/0119631 A1* 5/2011 Cho .................... G06F 3/04815 715/848
2011/0126160 A1* 5/2011 Han ..................... H04N 13/139 715/848
2011/0234586 A1* 9/2011 Aoki .................... H04N 13/341 345/419
2012/0139914 A1* 6/2012 Jeon ........................ G06F 3/011 345/419
2014/0063054 A1* 3/2014 Osterhout ............. G06T 19/006 345/633
2015/0082181 A1* 3/2015 Ames .................. G06F 3/04815 715/738
2015/0346981 A1* 12/2015 Johnson .............. G06F 3/04815 345/419
2016/0105475 A1* 4/2016 Goodman ............. G06F 3/0487 715/810
2018/0011620 A1* 1/2018 Troy ................... G06F 3/04815
2018/0114359 A1* 4/2018 Song ................ H04N 21/42202
2018/0173323 A1* 6/2018 Harvey ................... G06F 3/011
2018/0181199 A1* 6/2018 Harvey ................... G06F 3/014
2018/0286126 A1* 10/2018 Schwarz ............. G06F 3/04845
2018/0308288 A1* 10/2018 Harscoet ............. G06F 3/04815
2019/0073109 A1* 3/2019 Zhang ..................... G06F 3/013
2019/0197785 A1 6/2019 Tate-Gans et al.
2020/0294316 A1* 9/2020 Ikeda .................... G06F 3/0426
2020/0320794 A1* 10/2020 Huang .................. G06F 3/1454
2021/0065436 A1* 3/2021 Oriol .......................... G06T 5/70
2022/0214743 A1* 7/2022 Dascola .................. G06F 3/017
2022/0229534 A1* 7/2022 Terre ................... G06F 3/04815
2022/0254120 A1* 8/2022 Berliner .................. G06F 3/011
2022/0255995 A1* 8/2022 Berliner .............. G06F 3/04883
2022/0318033 A1* 10/2022 Pfoertsch ................ G06F 9/451
2023/0237192 A1* 7/2023 Kahan .................... G01C 21/00 726/1

OTHER PUBLICATIONS

Korean Patent Application No. 10-2024-7017176; Office Action dated Aug. 18, 2025, 8 pages with English language translation.

European Patent Application No. 22844357.8; Office Action dated Oct. 27, 2025, 6 pages.

Indian Patent Application No. 202417040050, Office Action dated Nov. 10, 2025, 11 pages with English translation.

* cited by examiner

USER INTERFACE MODES FOR THREE-DIMENSIONAL DISPLAY

CROSS REFERENCE TO RELATED APPLICATIONS

This application is a continuation of U.S. patent application Ser. No. 17/992,887, entitled "User Interface Modes for Three-Dimensional Display," filed on Nov. 22, 2022, which claims the benefit of priority to U.S. Provisional Application No. 63/285,470, entitled "User Interface Modes for Three-Dimensional Display," filed on Dec. 2, 2021, the disclosure of each of which is hereby incorporated herein in its entirety.

TECHNICAL FIELD

The present description relates generally to electronic devices including, for example, user interface modes for three-dimensional display.

BACKGROUND

Augmented reality technology aims to bridge a gap between virtual environments and a physical environment by providing a view of the physical environment that is augmented with electronic information. As a result, the electronic information appears to be part of the physical environment as perceived by a user.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
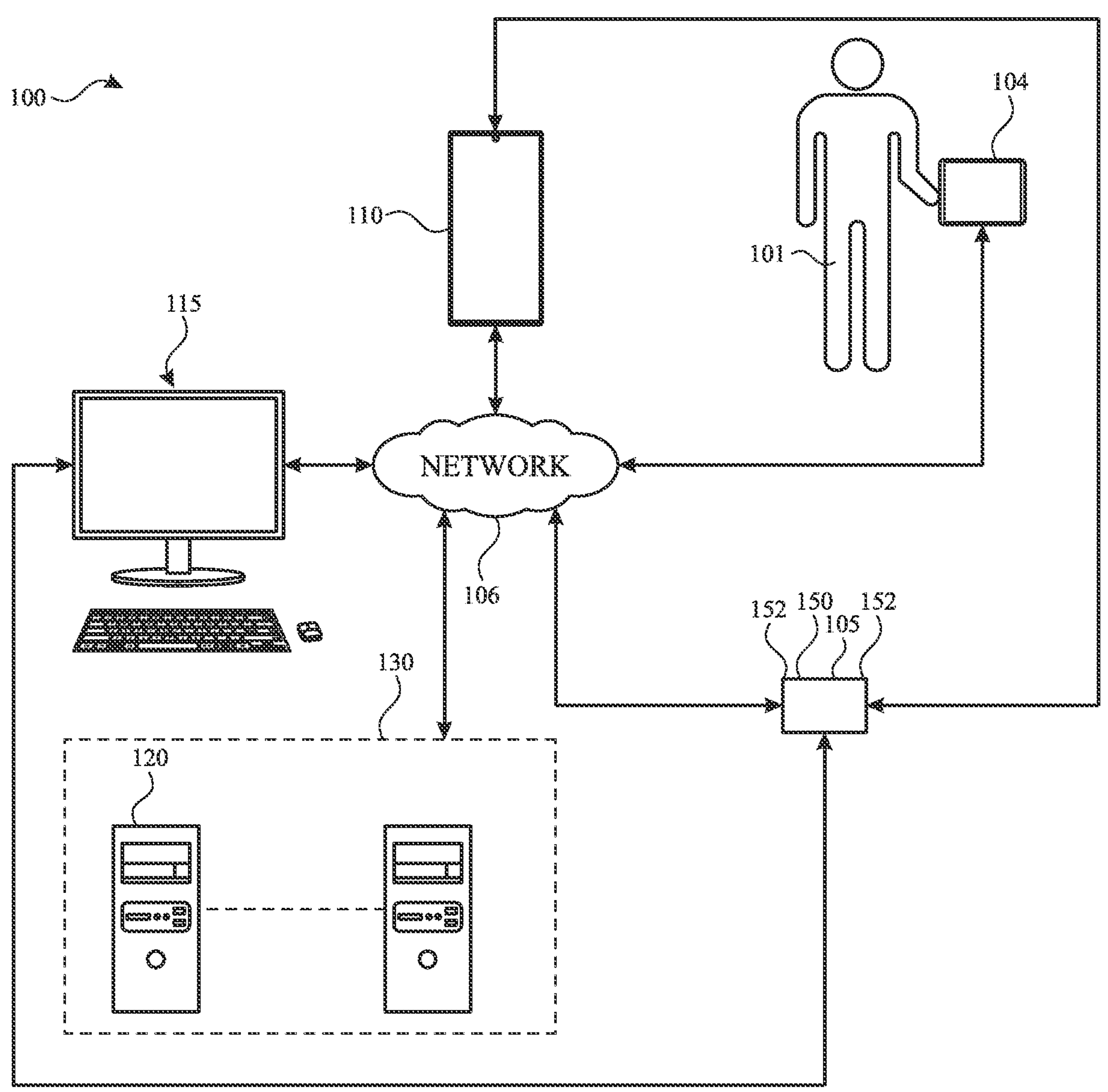
FIG. 1 illustrates an example system architecture including various electronic devices that may implement the subject system in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Implementations of the subject technology described herein provide for various user interface modes for a user interface of an application running on an electronic device. In one or more implementations, an application may provide a user interface that operates in a single user interface mode of several user interface modes available on an electronic device. In one or more implementations, an application may provide a user interface that is switchable between multiple user interface modes available on an electronic device.

In one or more implementations, a display of an electronic device may display a user interface of an application to appear, in a first user interface mode, at a perceivable location (e.g., a location at which the user interface is to be perceived by a user when the display is viewed by a user), remote from the display, within a physical environment. The electronic device may receive a user request to change the user interface to a second user interface mode, and modify, responsive to the user request, the displayed user interface of the application to the second user interface mode.

The disclosed technology can also provide constrained scene information to an electronic device application that operates based on scene information, based on the user interface mode of the UI of the application. For example, in order to allow an application to operate based on scene information for a physical environment (e.g., information about the physical contents of the physical environment) in a bounded UI mode, without allowing the application access to the entirety of the scene information, a system process of an electronic device may only provide subset of the scene information to the application while the UI is displayed in the bounded UI mode. This can be helpful, for example, in protecting the privacy of a user of the electronic device and/or other people in and/or associated with the physical environment.

The subset of the scene information may be a subset of the scene information that corresponds to a portion of the physical environment within a boundary in which a user interface (UI) of the application is displayed (e.g., a two-dimensional boundary or a three-dimensional boundary around the apparent location of the UI in the bounded UI mode). For example, scene information corresponding to other portions of the physical environment may be obtained by the system process and not provided to the application. The system process may also constrain user information that is provided to the application, such as to a subset of the user information that occurs within the boundary in which the UI appears to be displayed in the bounded UI mode. For example, gesture inputs and/or gaze locations that occur within that boundary may be provided to the application, and the application may be prevented from receiving gesture inputs and/or gaze locations that occur outside that boundary. In one or more implementations, the scene information and/or user information that is available to an application can contract or expand if the application's assigned volume changes accordingly, such that, for example, an application may be given access to all scene information in a use case in which the user interface of the application is switched/expanded to a full-screen mode (e.g., a full screen mixed reality (MR) user interface mode). In one or more implementations, because the scene information that is provided to the application may be expanded when the user interface mode is switched to a full screen UI mode, the electronic device may request user authorization for access to the expanded scene information before allowing the UI to enter the full screen UI mode.

FIG. 1 illustrates an example system architecture 100 including various electronic devices that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture 100 includes an electronic device 105, an electronic device 110, an electronic device 115, and a server 120. For explanatory purposes, the system architecture 100 is illustrated in FIG. 1 as including the electronic device 105, the electronic device 110, the electronic device 115, and the server 120; however, the system architecture 100 may include any number of electronic devices and any number of servers or a data center including multiple servers.

The electronic device 105 may be smart phone, a tablet device, or a wearable device such as a head mountable portable system, that includes a display system capable of presenting a visualization of an extended reality environment to a user 101. The electronic device 105 may be powered with a battery and/or any other power supply. In an example, the display system of the electronic device 105 provides a stereoscopic presentation of the extended reality environment, enabling a three-dimensional visual display of a rendering of a particular scene, to the user. In one or more implementations, instead of, or in addition to, utilizing the electronic device 105 to access an extended reality environment, the user may use an electronic device 104, such as a tablet, watch, mobile device, and the like.

The electronic device 105 may include one or more cameras such as camera(s) 150 (e.g., visible light cameras, infrared cameras, etc.) Further, the electronic device 105 may include various sensors 152 including, but not limited to, cameras, image sensors, touch sensors, microphones, inertial measurement units (IMU), heart rate sensors, temperature sensors, Lidar sensors, radar sensors, sonar sensors, GPS sensors, Wi-Fi sensors, near-field communications sensors, etc.) Moreover, the electronic device 105 may include hardware elements that can receive user input such as hardware buttons or switches. User input detected by such sensors and/or hardware elements correspond to various input modalities for interacting with virtual content displayed within a given extended reality environment. For example, such input modalities may include, but not limited to, facial tracking, eye tracking (e.g., gaze direction), hand tracking, gesture tracking, biometric readings (e.g., heart rate, pulse, pupil dilation, breath, temperature, electroencephalogram, olfactory), recognizing speech or audio (e.g., particular hotwords), and activating buttons or switches, etc. The electronic device 105 may also detect and/or classify physical objects in the physical environment of the electronic device 105.

The electronic device 105 may be communicatively coupled to a base device such as the electronic device 110 and/or the electronic device 115. Such a base device may, in general, include more computing resources and/or available power in comparison with the electronic device 105. In an example, the electronic device 105 may operate in various modes. For instance, the electronic device 105 can operate in a standalone mode independent of any base device. When the electronic device 105 operates in the standalone mode, the number of input modalities may be constrained by power limitations of the electronic device 105 such as available battery power of the device. In response to power limitations, the electronic device 105 may deactivate certain sensors within the device itself to preserve battery power.

The electronic device 105 may also operate in a wireless tethered mode (e.g., connected via a wireless connection with a base device), working in conjunction with a given base device. The electronic device 105 may also work in a connected mode where the electronic device 105 is physically connected to a base device (e.g., via a cable or some other physical connector) and may utilize power resources provided by the base device (e.g., where the base device is charging the electronic device 105 while physically connected).

When the electronic device 105 operates in the wireless tethered mode or the connected mode, a least a portion of processing user inputs and/or rendering the extended reality environment may be offloaded to the base device thereby reducing processing burdens on the electronic device 105. For instance, in an implementation, the electronic device 105 works in conjunction with the electronic device 110 or the electronic device 115 to generate an extended reality environment including physical and/or virtual objects that enables different forms of interaction (e.g., visual, auditory, and/or physical or tactile interaction) between the user and the extended reality environment in a real-time manner. In an example, the electronic device 105 provides a rendering of a scene corresponding to the extended reality environment that can be perceived by the user and interacted with in a real-time manner. Additionally, as part of presenting the rendered scene, the electronic device 105 may provide sound, and/or haptic or tactile feedback to the user. The content of a given rendered scene may be dependent on available processing capability, network availability and capacity, available battery power, and current system workload.

The electronic device 105 may also detect events that have occurred within the scene of the extended reality environment. Examples of such events include detecting a presence of a living being such as a person or a pet, a particular person, entity, or object in the scene. Detected physical objects may be classified by electronic device 105, electronic device 110, and/or electronic device 115 and the location, position, size, dimensions, shape, and/or other characteristics of the physical objects can be used to provide physical anchor objects for an XR application generating virtual content, such as a UI of an application, for display within the XR environment.

It is further appreciated that the electronic device 110 and/or the electronic device 115 can also generate such extended reality environments either working in conjunction with the electronic device 105 or independently of the electronic device 105.

The network 106 may communicatively (directly or indirectly) couple, for example, the electronic device 105, the electronic device 110 and/or the electronic device 115 with the server 120 and/or one or more electronic devices of one or more other users. In one or more implementations, the network 106 may be an interconnected network of devices that may include, or may be communicatively coupled to, the Internet.

The electronic device 110 may include a touchscreen and may be, for example, a smartphone that includes a touchscreen, a portable computing device such as a laptop computer that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 110 may not include a touchscreen but may support touchscreen-like gestures, such as in an extended reality environment. In one or more implementations, the electronic device 110 may include a touchpad. In FIG. 1, by way of example, the electronic device 110 is depicted as a mobile smartphone device with a touchscreen. In one or more implementations, the electronic device 110, the electronic device 104, and/or the electronic device 105 may be, and/or may include all or part of, the electronic system discussed below with respect to FIG. 6. In one or more implementations, the electronic device 110 may be another device such as an Internet Protocol (IP) camera, a tablet, or a peripheral device such as an electronic stylus, etc.

The electronic device 115 may be, for example, desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 115 is depicted as a desktop computer. The electronic device 115 may be, and/or may include all or part of, the electronic system discussed below with respect to FIG. 6.

The server 120 may form all or part of a network of computers or a group of servers 130, such as in a cloud computing or data center implementation. For example, the server 120 stores data and software, and includes specific hardware (e.g., processors, graphics processors and other specialized or custom processors) for rendering and generating content such as graphics, images, video, audio and multi-media files for extended reality environments. In an implementation, the server 120 may function as a cloud storage server that stores any of the aforementioned extended reality content generated by the above-discussed devices and/or the server 120.

Figure 2:
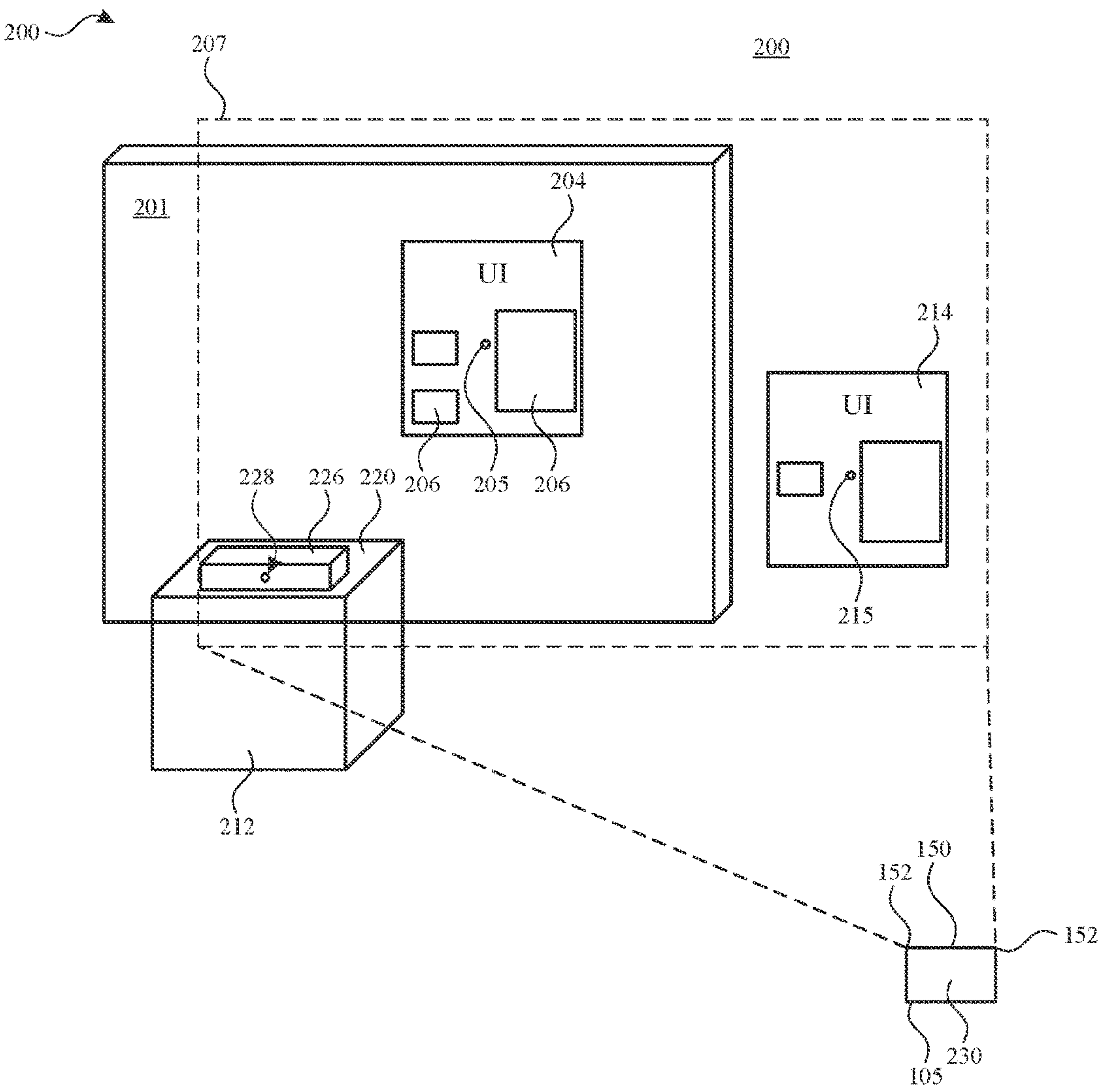
FIG. 2 illustrates an example of an extended reality environment including multiple user interfaces displayed, by an electronic device, to appear at multiple respective locations in a physical environment in accordance with aspects of the subject technology.

FIG. 2 illustrates an example of a physical environment 200 in which the electronic device 105 may be operated. In the example of FIG. 2, the electronic device 105 (e.g., display 230 of the electronic device 105) displays virtual content to be perceived by a user viewing the display 230 of the electronic device 105 at various locations in the physical environment 200 (e.g., at anchor locations determined by the electronic device). When the virtual content is displayed by the electronic device 105 that causes the virtual content to appear to the user to be in the physical environment 200, the combined physical environment and the virtual content may form an XR environment.

In the example of FIG. 2, the display 230 of electronic device 105 displays a user interface (UI) 204 of an application running on the electronic device 105. In this example, the displayed location of the UI 204 on the display 230 is displayed in a bounded two-dimensional UI mode, and may be anchored, by the electronic device 105, to a physical anchor location 205, such that the UI 204 displayed in the viewable area 207 of the display 230 appears to the user as if disposed on a physical wall 201 in the physical environment 200. As shown in FIG. 2, UI 204 may include one or more elements 206. Elements 206 may include text entry fields, buttons, selectable tools, scrollbars, menus, drop-down menus, links, plugins, image viewers, media players, sliders, gaming characters, other virtual content, or the like.

In the example of FIG. 2, UI 204 is displayed in the viewable area 207 of the display 230 of the electronic device 105 to appear, in an extended reality environment generated in part by electronic device 105, as if attached to the physical wall 201 in the physical environment 200. In the example of FIG. 2, the electronic device 105 also displays a UI 214 (e.g., a UI of another application running on the electronic device and displayed at another location within the viewable area 207 of the display 230) to be perceived by the user at another location in the physical environment. In this example, the UI 214 is displayed in a bounded two-dimensional UI mode, and may be anchored to a virtual anchor location 215 (e.g., an anchor location in the physical environment unassociated with a physical object). In this example, the UI 214 appears as a floating UI in the physical environment 200. In one or more implementations, a bounded two-dimensional UI mode may be a backwards compatible UI mode that mimics the two-dimensional display of the same UI on a two-dimensional display device (e.g., a display of a smartphone, a tablet device, a laptop computer, or a desktop computer) and that only receives information such as button presses or clicks from the operating system of the electronic device 105. In one or more implementations, a bounded two-dimensional UI mode may be an XR bounded two-dimensional UI mode in which UI elements can be displayed, moved, and/or interacted with using three-dimensional gestures detected by the electronic device 105 and provided to the underlying application of the UI.

In the example of FIG. 2, a physical table 212 is also present in the physical environment 200. In this example, the electronic device 105 also displays a UI 226 (e.g., a UI of yet another application running on the electronic device and displayed at yet another location within the viewable area 207 of the display 230) to be perceived by the user on a surface 220 of the physical table 212 in the physical environment 200. In the example of FIG. 2, the UI 226 is displayed in a bounded three-dimensional UI mode. In one or more implementations, the displayed location of the UI 226 on the display 230 may be anchored, by the electronic device 105, to a physical anchor location 228 on the surface 220 of the physical table 212. In one or more implementations, the UI 226 may include a virtual game board (e.g., a virtual chess board, a virtual checkers board, or other virtual board game setup), a virtual keyboard, a virtual character (e.g., a virtual animal, person, or fantastical character), or any other virtual object.

In various implementations, the physical anchor locations 205 and 228, and/or the virtual anchor location 215, may be generated by each applications for its corresponding UI, or may be generated by a system process of the electronic device 105 on behalf of an application, based on scene information obtained using camera(s) 150 and/or sensor(s) 152 of the electronic device. However, in many use cases, it may be undesirable to allow the applications underlying the UI 204, the UI 214, and/or the UI 226 to access some or all of the scene information that describes the content of the physical environment 200, and/or to access some or all of the user information such as user gestures performed in the physical environment.

For example, it may be generally undesirable to allow an application to obtain image information, sensor information, and/or scene information based on the image information and/or sensor information, that describes the entire physical environment 200. This is because the physical environment 200 may include user-specific information and/or objects. As another example, it may be desirable to prevent one application from receiving gesture-input information and/or voice-input information being provided to the UI of another application. For example, in one illustrative use case, the UI 204 may be a UI of a banking application, and the UI 214 may be a UI of a social media application. In this illustrative use case, when the user performs gestures or other inputs to the banking application (e.g., to enter private and/or sensitive banking information, such as account numbers and/or passwords), it may be desirable to prevent the social media application from receiving gesture information associated with those gestures.

However, because, in an extended reality environment, the user may be not physically touching any physical sensors (e.g., touch sensors) co-located with the display pixels displaying the UI, it can be difficult to determine which UI(s) (e.g., and which underlying application(s)) should receive the user input and/or other scene information associated with the physical environment 200.

Aspects of the subject technology can facilitate the operation of an application in various UI modes, including UI modes in which the display of an electronic device concurrently displays the UIs of multiple applications, based on scene information for the physical environment 200 and/or user information such as gesture information, while protecting the privacy of personally identifiable scene information and/or user information. For example, the electronic device 105 may only allow each application running on the device to obtain scene information and/or user information (e.g., gesture information and/or gaze information) that occurs and/or originates within a subset of the physical environment defined by a boundary that has been assigned to a bounded UI of that application.

Figure 3:
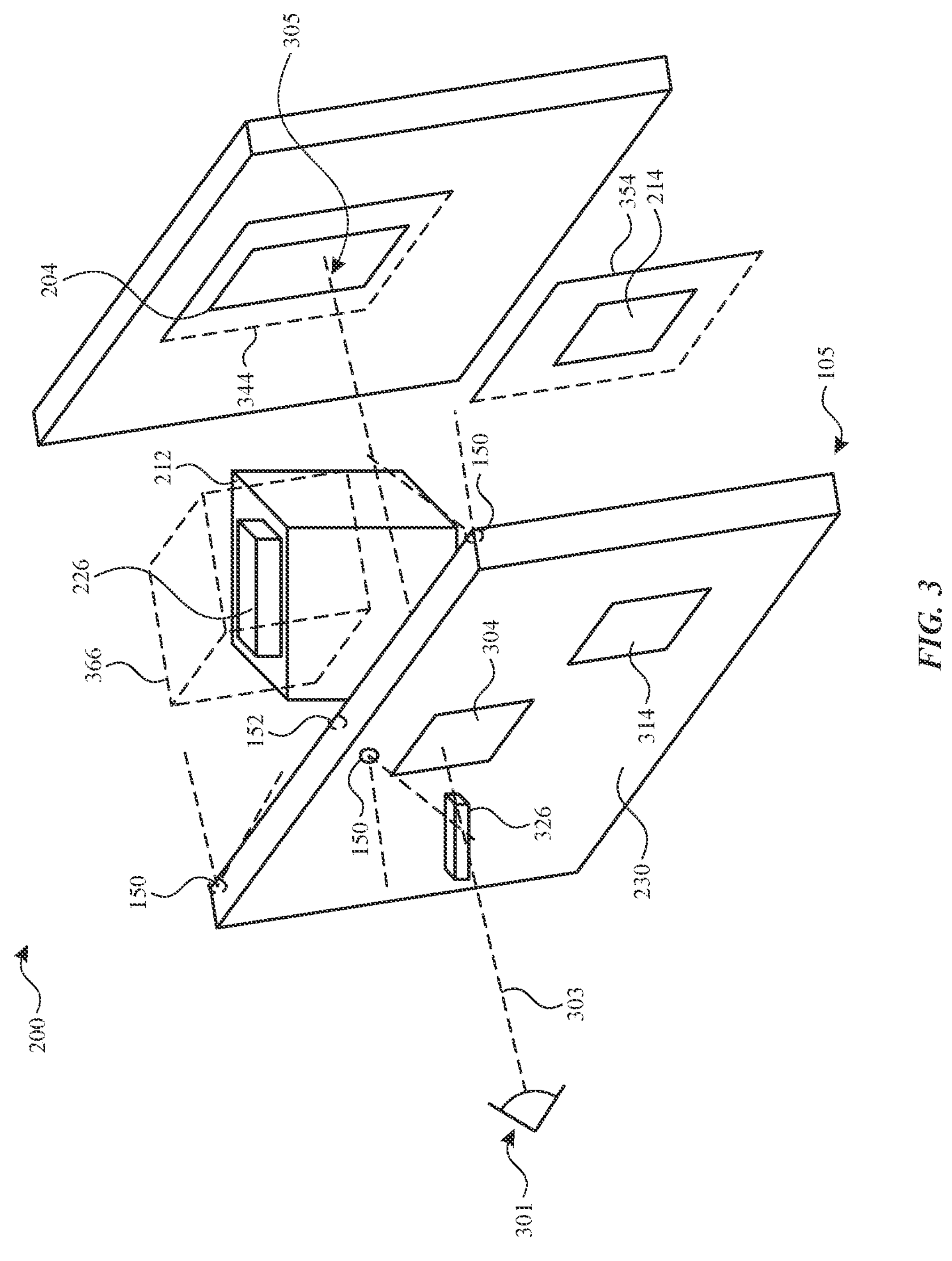
FIG. 3 illustrates various portions of the physical environment of FIG. 2 assigned for various user interfaces displayed to appear in the physical environment in accordance with one or more implementations.

For example, FIG. 3 illustrates an example in which, for each UI (e.g., and each underlying application), the electronic device 105 (e.g., a system process of the electronic device 105) assigns a boundary that defines portion of the physical environment 200 that includes the location, remote from the electronic device 105, at which the UI appears to be displayed (e.g., at which the display 230 causes the UI to be perceived by a user of the electronic device 105, even though no physical display may be occurring at the perceived/apparent location).

In the example of FIG. 3, the display 230 of the electronic device 105 displays a representation 304 of the UI 204, displayed in a bounded two-dimensional UI mode at a location on the display 230 that causes the UI 204 to appear, to a user viewing the display 230, as a two-dimensional UI on the physical wall 201 behind the display 230. As shown, the display 230 of the electronic device 105 also displays a representation 314 of the UI 214 in a bounded two-dimensional UI mode, displayed at a location on the display 230 that causes the UI 214 to appear to be a floating two-dimensional UI, and a representation 326 of the UI 226 in a bounded three-dimensional UI mode, displayed at a location on the display 230 that causes the UI 226 to appear to be a three-dimensional UI located on the physical table 212. In various implementations as described herein, the display 230 can be a transparent or translucent display that allows the user to view the physical environment directly through the viewable area of the display, or the display may be a pass-through video display that captures images of the physical environment and displays representations of physical environment objects on the display 230 along with the device-generated content (e.g., including the representations 304, 314, and 326 of the UIs 204, 214, and 226 in this example) in some UI modes.

As illustrated in FIG. 3, the electronic device may assign a boundary 344 (e.g., a two-dimensional boundary) that defines a portion (e.g., a two-dimensional portion) of the physical environment 200, including the location at which the UI 204 is displayed to appear, to the application that provides the UI 204. In this example, the electronic device 105 also assigns a boundary 354 (e.g., a two-dimensional boundary) that defines a portion (e.g., a two-dimensional portion) of the physical environment 200, including the location at which the UI 214 is displayed to appear, to the application that provides the UI 214, and assigns a boundary 366 (e.g., a three-dimensional boundary) that defines a portion (e.g., a three-dimensional portion) of the physical environment 200, including the location at which the UI 226 is displayed to appear, to the application that provides the UI 226.

In the example of FIG. 3, the boundaries 344, 354, and 366 define portions of the physical environment 200 that are rectilinear two-dimensional areas or rectilinear three-dimensional volumes within the physical environment. However, it is also appreciated that a boundary that is assigned to an application can have any suitable size or shape, and can also be adjustable and/or changeable based on UI mode, the size, shape, location, and/or content of the corresponding UI, and/or based on the scene information for the physical and/or XR environment (e.g., based on the presence of physical and/or virtual objects, including other UIs) in the vicinity of the assigned portion of the physical environment.

The electronic device 105 may obtain (e.g., using camera(s) 150) and/or sensor(s) 152) scene information corresponding to the physical environment 200 of the electronic device 105. For example, the system process may detect and/or identify physical objects in the physical environment 200, generate a three-dimensional map of the physical environment 200, and/or obtain other scene information describing the physical characteristics of the physical environment 200. The electronic device 105 may determine, for each of the UI 204, the UI 214, and the UI 226, a respective subset of the scene information that is within the boundary 344, the boundary 354, and the boundary 366 of the physical environment 200.

The electronic device 105 may provide, by the system process, the subset of the scene information for each application, to that application, without providing a remaining portion of the scene information to the application. The subset of the scene information that corresponds to a particular portion (e.g., the portion defined by the boundary 344, the boundary 354, and the boundary 366) of the physical environment 200 may include the location of anchors (e.g., physical and/or virtual anchors), and/or the location, type, images, and/or other characteristics of one or more physical objects within that portion of the physical environment. For example, in the bounded UI modes of FIG. 3, the application that generates the UI 204 may be informed of the presence of the physical wall 201, or a portion thereof, but not be informed of the presence of the physical table 212. As another example, the application that generates the UI 226 may be informed of the presence of the physical table 212, or a portion (e.g., a surface) thereof, but not be informed of the presence of the physical wall 201.

As discussed herein, in the bounded UI modes of FIG. 3, the electronic device 105 may also provide only a subset of user information obtained by the electronic device to each application. For example, while operating the electronic device 105, the user may look around the physical environment 200, including looking at the UI 204, the UI 214, and/or the UI 226 at various times. The user may also move within the physical environment 200, including performing hand gestures that correspond to gesture inputs to the UI 204, the UI 214, and/or the UI 226 at various times, and/or performing hand movements that are unassociated with gesture inputs to the electronic device 105. In one or more implementations, the electronic device 105 may only provide gesture information to the applications corresponding to the UI 204, the UI 214, and/or the UI 226 when a gesture input occurs within the respective boundary 344, 354, and/or 366 for that UI.

As another example, FIG. 3 illustrates how an eye 301 of a user can have a line of sight (e.g., a gaze direction 303) that intersects with the UI 204. Although only a single gaze direction 303 for a single eye 301 is illustrated in FIG. 3, it is appreciated that, by obtaining gaze directions for both eyes of a user, the electronic device 105 can determine a gaze location 305 (e.g., a three-dimension gaze location) on which the user's gaze is landing at any given time. In this example, the electronic device 105 may determine that the gaze location 305 is within the boundary 344, and provide gaze information (e.g., the gaze location) to the application corresponding to the UI 204. In this example, no gaze information is provided to the applications corresponding to the UI 214 or the UI 226 (e.g., until the user's gaze moves to position the gaze location 305 within the boundary 354 or the boundary 366 of the physical environment, or until the user switches the UI mode of an application to expand a corresponding boundary). In this way, when one or more UIs are displayed in a bounded UI mode, only the scene information and/or user information that is used by an application for its own operations are provided to that application by the electronic device 105. In one or more implementations, no gaze information may be provided to an application having a UI in a bounded UI mode. For example, the system process of the electronic device 105 may, instead, use a gaze location within a boundary of a bounded UI to indicate that a gesture input should be provided to that UI, without providing any gaze information to the bounded UI. In one or more implementations, some or all of the gaze information may be provided (with the user's permission) to an application having a UI in a full screen UI mode, as discussed in further detail hereinafter.

Figure 4:
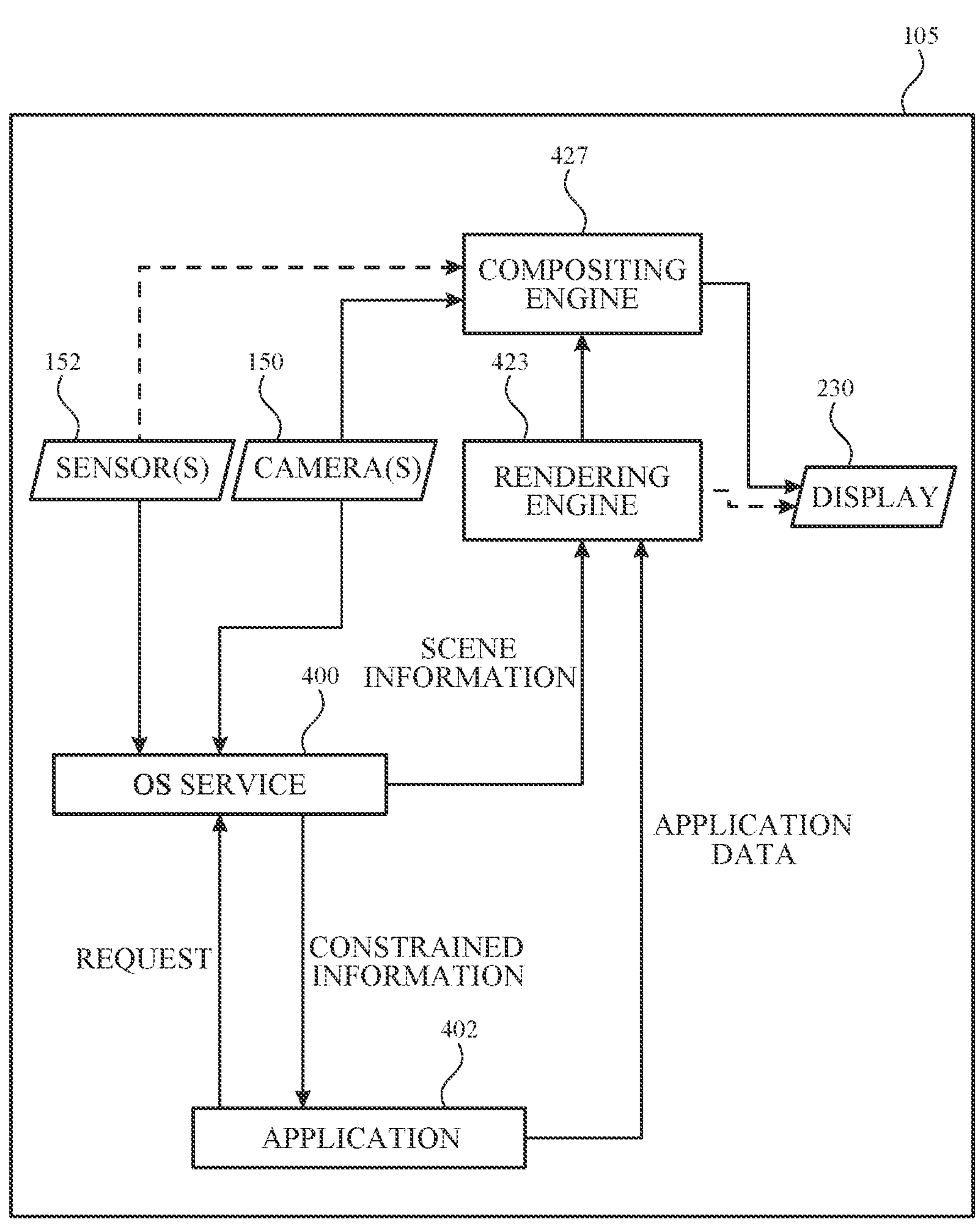
FIG. 4 illustrates an example electronic device providing constrained access to scene information in accordance with one or more implementations.

FIG. 4 illustrates how a system process of the electronic device 105 may control (e.g., constrain) the access, by various applications, to scene information and/or user information. For example, FIG. 4 illustrates an example architecture that may be implemented by the electronic device 105 in accordance with one or more implementations of the subject technology. For explanatory purposes, portions of the architecture of FIG. 4 are described as being implemented by the electronic device 105 of FIG. 1, such as by a processor and/or memory of the electronic device; however, appropriate portions of the architecture may be implemented by any other electronic device, including the electronic device 110, electronic device 115, and/or server 120. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

Various portions of the architecture of FIG. 4 can be implemented in software or hardware, including by one or more processors and a memory device containing instructions, which when executed by the processor cause the processor to perform the operations described herein. For example, in FIG. 4, the trapezoidal boxes may indicate that the sensors 152, the camera(s) 150 and the display 230 may be hardware components, and the rectangular boxes may indicate that the OS service 400, the application 402, the rendering engine 423, and the compositing engine 427 may be implemented in software, including by one or more processors and a memory device containing instructions, which when executed by the processor cause the processor to perform the operations described herein.

In the example of FIG. 4, an application such as application 402 (e.g., an application having a UI 204 displayed in a bounded two-dimensional UI mode, as illustrated in FIGS. 2 and 3, or in a full screen UI mode as described hereinafter) provides application data to a rendering engine 423 for rendering of the application data, such as for rendering of the UI 204 of the application. Application 402 may be a gaming application, a media player application, a content-editor application, a training application, a simulator application, a social media application, or generally any application that provides a UI or other content for display at a location that depends on the physical environment, such as by anchoring the UI or other content to an anchor in the physical environment. The application data may include application-generated content (e.g., windows, buttons, tools, characters, images, videos, etc.) and/or user-generated content (e.g., text, images, etc.), and information for rendering the content in the UI. In one or more implementations, rendering engine 423 renders the UI 204 for display by a display such as display 230 of the electronic device 105. In one or more implementations, the OS service 400 may assign a portion of a physical environment of the electronic device (e.g., the portion defined by the boundary 344 of the physical environment 200, as in the example of FIG. 3), to the application 402 (e.g., while the application 402 is running on the electronic device 105 and while the UI 204 is displayed by the display 230 in the bounded two-dimensional display mode).

As shown in FIG. 4, additional information may be provided for display of the UI of the application 402, such as in a two-dimensional or three-dimensional (e.g., XR) scene (e.g., as in the examples of FIGS. 2 and 3). In the example of FIG. 4, sensors 152 may provide physical environment information (e.g., depth information from one or more depth sensors, motion information from one or more motion sensors), and/or user information to an OS service 400. Camera(s) 150 may also provide images of a physical environment and/or one or more portions of the user (e.g., the user's eyes, hands, face, etc.) to OS service 400. OS service 400 may generate scene information, such as three-dimensional map, of some or all of the physical environment of electronic device 105 using the environment information (e.g., the depth information and/or the images) from sensors 152 and camera(s) 150. The OS service 400 may also determine a gaze location, such as gaze location 305 of FIG. 3, based on images and/or other sensor data representing the position and/or orientation of the user's eye(s). The OS service 400 may also identify a gesture (e.g., a hand gesture) performed by a user of the electronic device 105, based on images and/or other sensor data representing the position and/or orientation of the user's hand(s) and/or arm(s).

As illustrated in FIG. 4, in one or more implementations, the application 402 may provide a request to the OS service 400. For example, the request may be a request for scene information (e.g., information describing the content of the physical environment), and/or a request for user information such as a request for a gaze location and/or user gesture information. In one example, the request may be an anchor request for a physical anchor (e.g., a horizontal surface, a vertical surface, a floor, a table, a wall, etc.).

As indicated in FIG. 4, the OS service 400 may determine the UI mode of the UI of the application, and provide constrained information to the application 402. In various implementations, the constrained information may be provided in response to the request from the application 402 or may be provided without an explicit request from the application 402. In one illustrative example, the constrained information may include scene information and/or user information that corresponds to the portion of the physical environment defined by the boundary 344 that has been assigned to the application 402 (e.g., by the OS service 400).

Application 402 may include code that, when executed by one or more processors of electronic device 105, generates application data, for display of the UI 204 on, near, attached to, or otherwise associated with an anchor location corresponding to the anchor identified by the identifier provided from OS service 400. Application 402 may include code that, when executed by one or more processors of electronic device 105, modifies and/or updates the application data based on user information (e.g., a gaze location and/or a gesture input) provided by the OS service 400. Application 402 may include code that, when executed by one or more processors of electronic device 105, modifies and/or updates the application data when a user switches to a different UI mode (e.g., from a two-dimensional UI mode to a three-dimensional UI mode, or from a bounded UI mode to a full screen UI mode).

Once the application data has been generated, the application data can be provided to the OS service 400 and/or the rendering engine 423, as illustrated in FIG. 4. As shown, scene information can also be provided to rendering engine 423. The scene information provided from the OS service 400 to the rendering engine 423 can include or be based on, as examples, environment information such as a depth map of the physical environment, and/or object information for detected objects in the physical environment. Rendering engine 423 can then render the application data from application 402 for display by display 230 of electronic device 105 to appear at a desired location in the physical environment 200. For example, the representation 304 of the UI 204 may be rendered for display at the appropriate location on the display 230, to appear to be located at a desired location in the physical environment 200, using the application data (which may be based on constrained scene information corresponding to the portion of the physical environment defined by the boundary 344) and using the scene information from the OS service 400 (which may include scene information for other portions of the physical environment). Display 230 may be, for example, an opaque display, and camera(s) 150 may be configured to provide a pass-through video feed to the opaque display. The UI 204 may be rendered for display at a location on the display corresponding to the displayed location of a physical anchor object in the pass-through video. Display 230 may be, as another example, a transparent or translucent display. The UI 204 may be rendered for display at a location on the display corresponding to a direct view, through the transparent or translucent display, of the physical environment 200.

As shown, in one or more implementations, electronic device 105 can also include a compositing engine 427 that composites video images of the physical environment, based on images from camera(s) 150, for display together with the UI 204 from rendering engine 423. For example, compositing engine 427 may be provided in an electronic device 105 that includes an opaque display, to provide pass-through video to the display. In an electronic device 105 that is implemented with a transparent or translucent display that allows the user to directly view the physical environment, compositing engine 427 may be omitted or unused in some circumstances, or may be incorporated in rendering engine 423. Although the example of FIG. 4 illustrates a rendering engine 423 that is separate from OS service 400, it should be appreciated that OS service 400 and rendering engine 423 may form a common service and/or that rendering operations for rendering content for display can be performed by the OS service 400. Although the example of FIG. 4 illustrates a rendering engine 423 that is separate from application 402, it should be appreciated that, in some implementations, application 402 may render content for display by display 230 without using a separate rendering engine. Although a single application 402 is depicted in FIG. 4, it is appreciated that multiple applications may be running concurrently on the electronic device 105, receiving constrained information corresponding to respective portions of the physical environment, and generating application data for rendering of respective UIs for display (e.g., concurrent display as in the examples of FIGS. 2 and 3) by display 230. In one or more implementations, compositing engine 427 may composite application data for multiple UIs of multiple applications for concurrent display.

Figure 5:
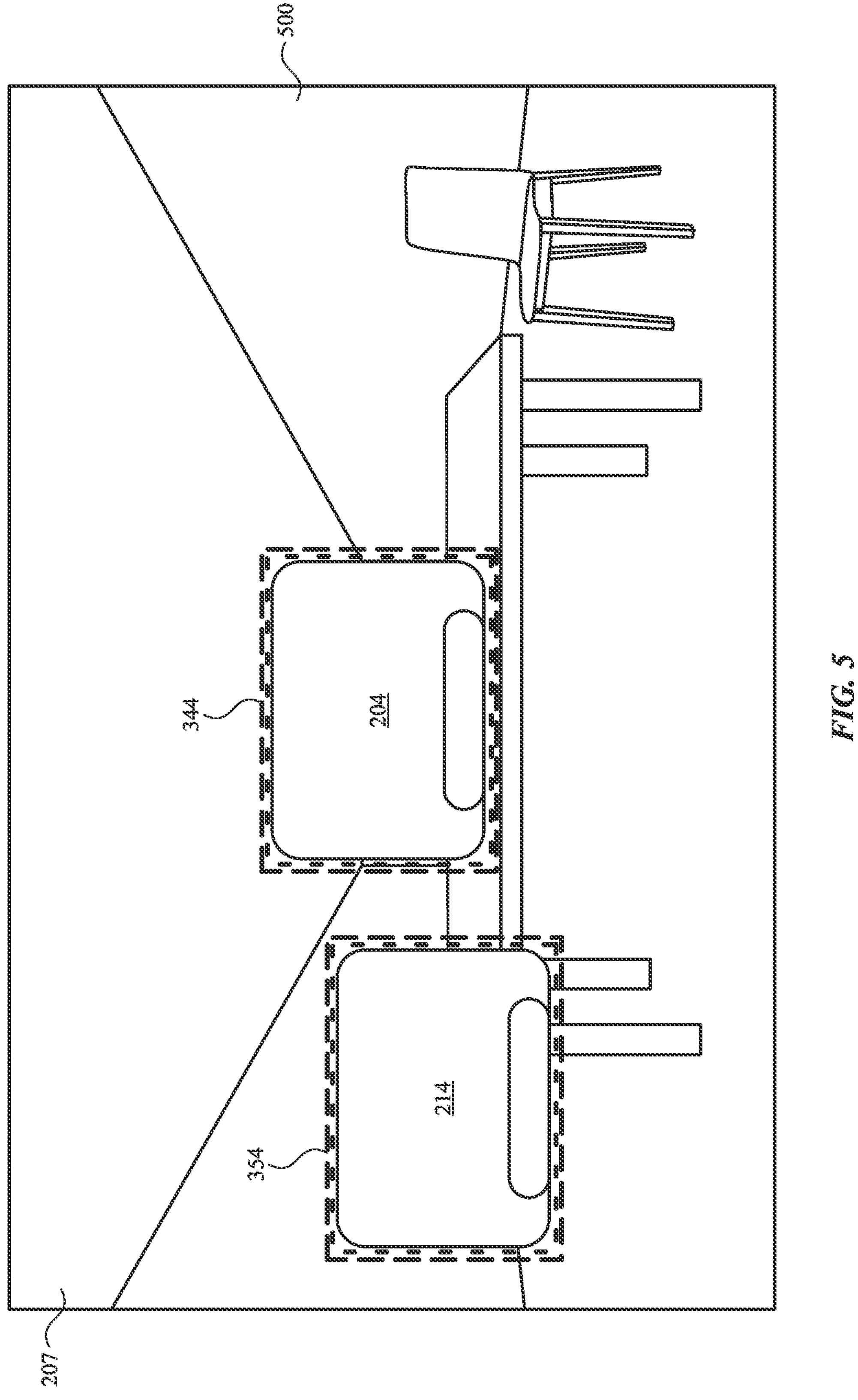
FIG. 5 illustrates an example of an extended reality environment having user interfaces displayed in a bounded two-dimensional display modes in accordance with one or more implementations.

FIG. 5 illustrates an example of an extended reality environment having user interfaces displayed in bounded two-dimensional display modes in accordance with one or more implementations. As shown in FIG. 5, the viewable area 207 of the display 230 of the electronic device 105 may display a view 500 (e.g., a pass-through video view) of a portion of the physical environment of the electronic device, and multiple UIs (e.g., UI 204 and UI 214) of multiple applications. As shown, the UI 204, when operated in a bounded two-dimensional UI mode as in the example of FIG. 5, may have an associated two-dimensional boundary (e.g., boundary 344) as described herein. As shown, the UI 214, when operated in a bounded two-dimensional UI mode concurrently with the UI 204 as in the example of FIG. 5, may have an associated two-dimensional boundary (e.g., boundary 354) as described herein. In one or more implementations, the boundary 344 and/or the boundary 354 may include multiple boundaries, such as a scene boundary within which scene information can be provided to the corresponding application, and a clipping boundary at which the UI or UI elements may be clipped. As shown in FIG. 5, each UI may be provided with a chrome that may be used for selecting, picking up, or moving the associated UI.

Figure 6:
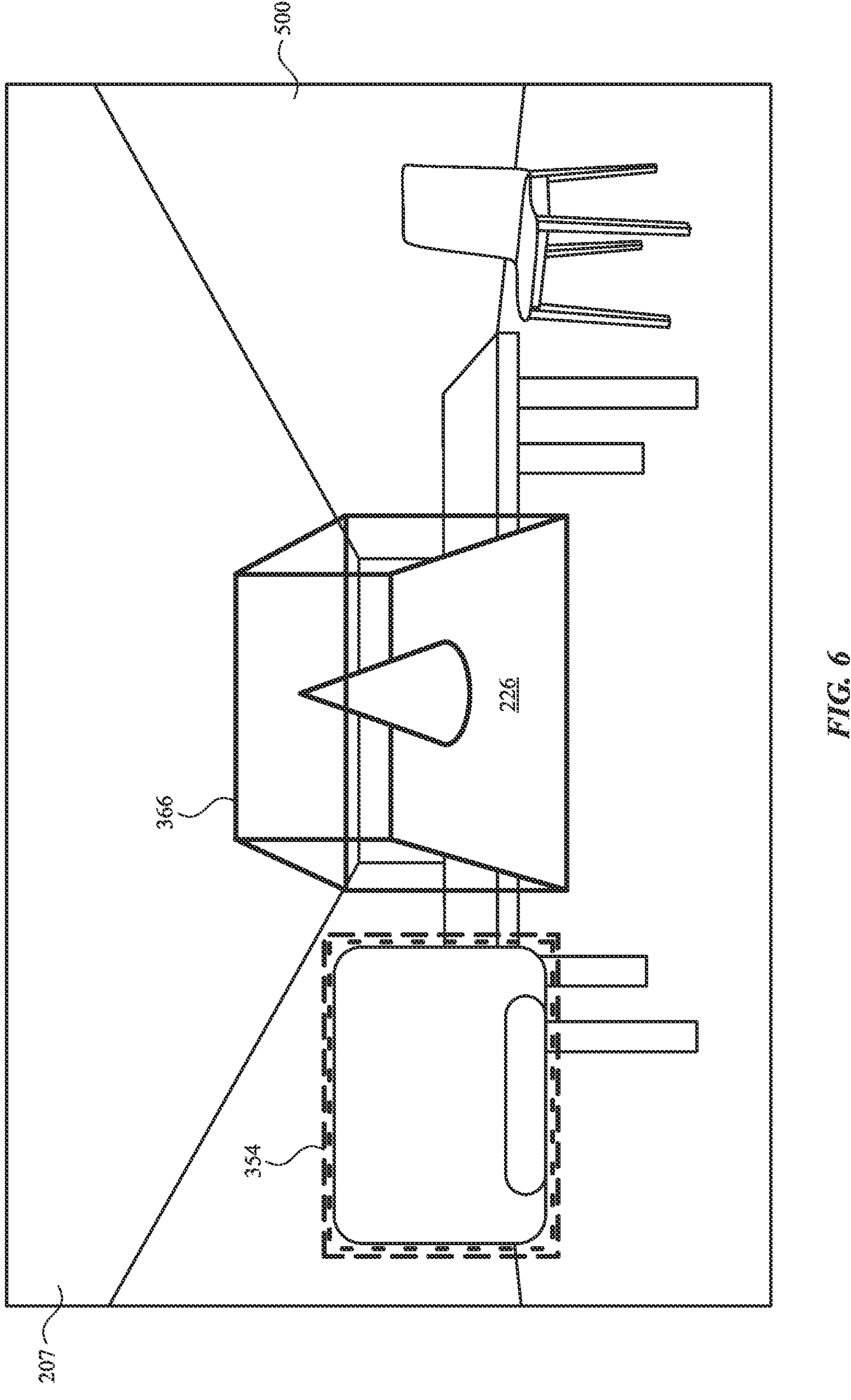
FIG. 6 illustrates an example of an extended reality environment having a user interface displayed in a bounded two-dimensional display mode and a user interface displayed in a bounded three-dimensional display mode in accordance with one or more implementations.

In the example of FIG. 5, the two bounded two-dimensional UIs are displayed in the viewable area 207. FIG. 6 illustrates another example in which UI 214 is displayed in bounded two-dimensional display mode within boundary 354, and UI 226 is concurrently displayed in a bounded three-dimensional display mode within boundary 366 in accordance with one or more implementations. In the example use cases of FIGS. 5 and 6, multiple UIs are concurrently displayed. In one or more other use cases, only one UI may be displayed, and the electronic device 105 may enhance the display area of the one displayed UI. For example, FIGS. 7, 8, and 9 illustrate examples of extended reality environments in which a user interface of a single application is the only user interface displayed in the viewable area 207 of the display.

Figure 7:
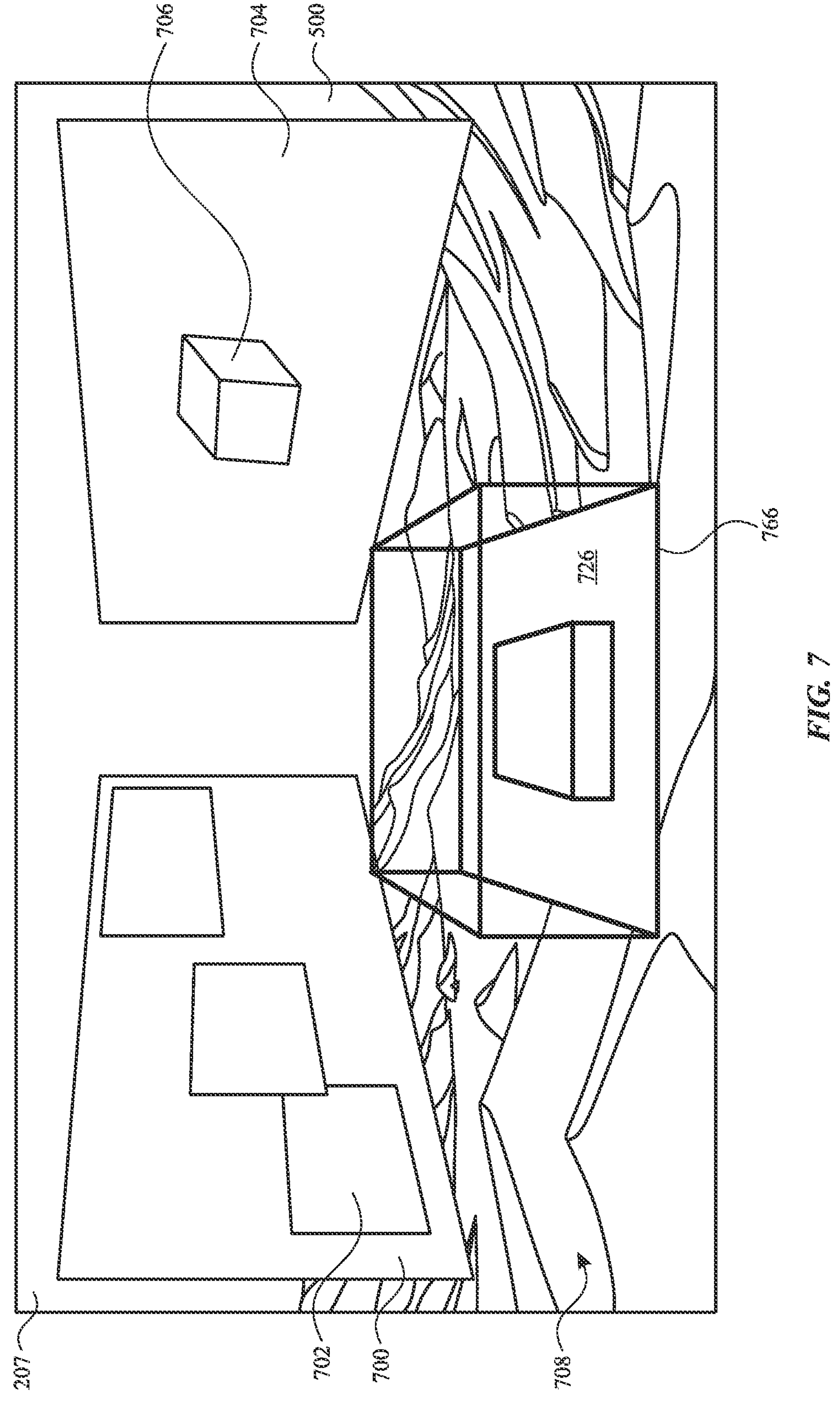
FIG. 7 illustrates an example of an extended reality environment in which a displayed user interface is the only user interface displayed by the display, and in which the user interface includes a bounded two-dimensional UI window, a bounded partial three-dimensional UI window and a bounded three-dimensional portion in accordance with one or more implementations.

In the example of FIG. 7, the displayed UI includes multiple UI elements. In this example, the displayed UI includes a two-dimensional UI window 700 displayed in a bounded two-dimensional display mode and having two-dimensional sub-elements 702. In this example, the displayed UI also includes a partially three-dimensional UI window 704 displayed in a bounded partial three-dimensional display mode and including a two-dimensional frame and three-dimensional sub-elements 706. In this example, the displayed UI also includes a bounded three-dimensional UI window 726 displayed in a bounded three-dimensional display mode and having a three-dimensional boundary 766. In this example, the electronic device 105 has determined that the content of the displayed UI relates to the planet Mars, and has modified a portion of the viewable area 207 outside the boundaries of the two-dimensional UI window 700, the partially three-dimensional UI window 704, and the bounded three-dimensional UI window 726 based on the content of the displayed UI (e.g., to display an enhancement 708, such as by displaying a translucent red background, corresponding to the red color of the planet Mars, over the viewable area 207).

Figure 8:
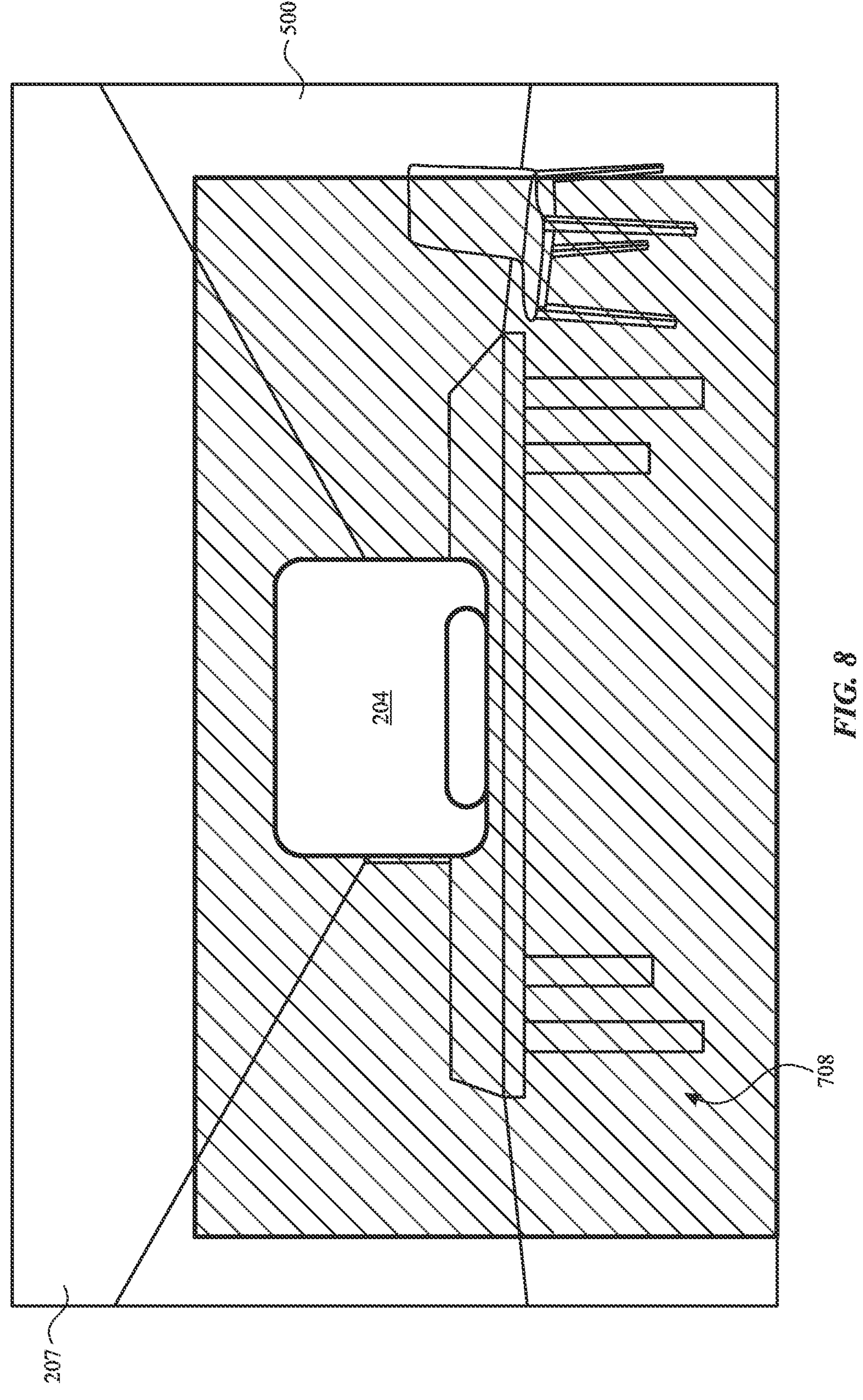
FIG. 8 illustrates an example of an extended reality environment in which a bounded two-dimensional user interface is the only user interface displayed by the display in accordance with one or more implementations.
Figure 9:
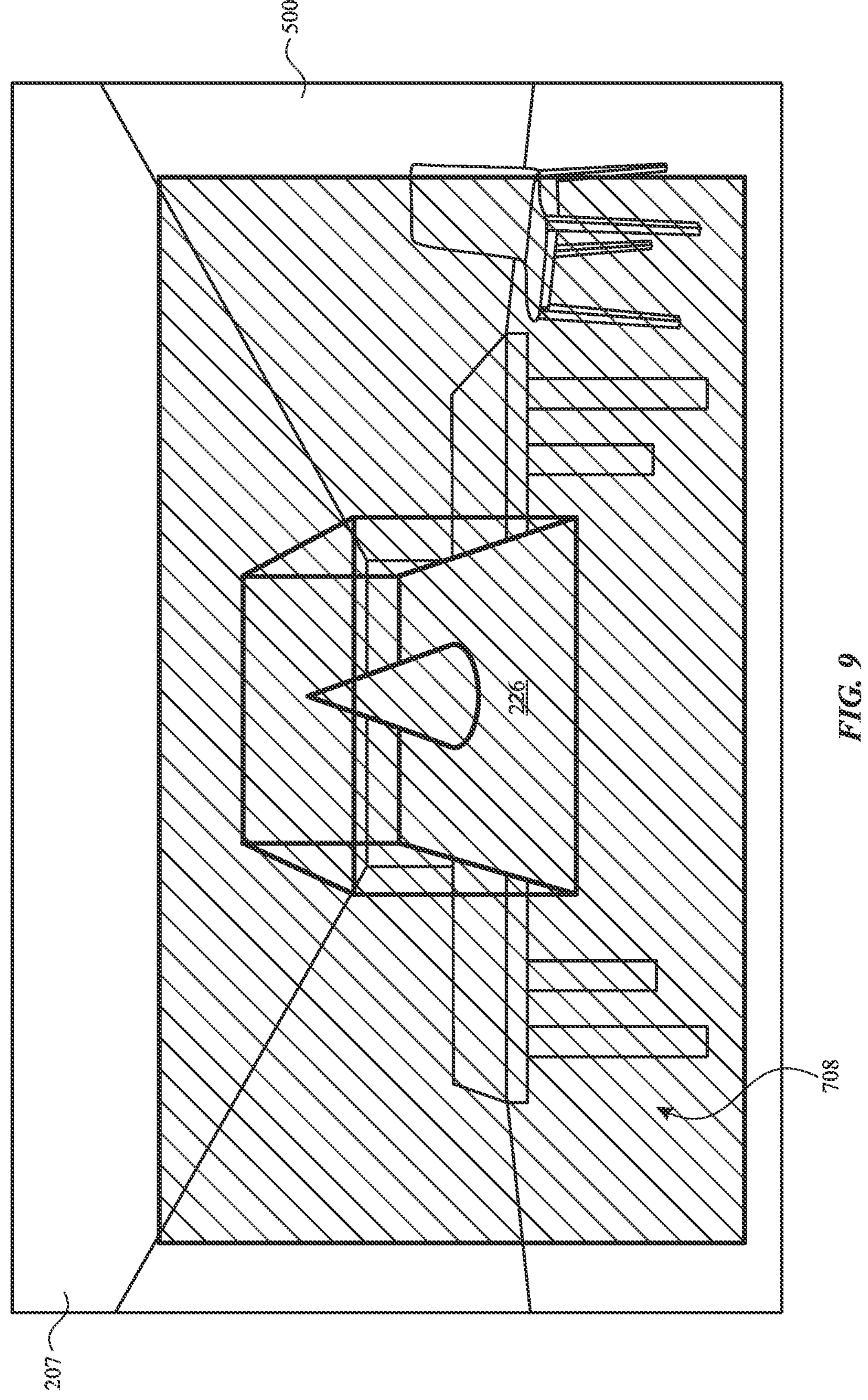
FIG. 9 illustrates an example of an extended reality environment in which a bounded three-dimensional user interface is the only user interface displayed by the display in accordance with one or more implementations.

FIG. 8 illustrates an example in which a single UI (e.g., UI 204) is displayed in a bounded two-dimensional UI mode, and the electronic device 105 has displayed an enhancement 708 within the viewable area 207 and outside the boundary of the single UI, based on the content of the single bounded two-dimensional. FIG. 9 illustrates an example in which a single UI (e.g., UI 226) is displayed in a bounded three-dimensional UI mode, and the electronic device 105 has displayed an enhancement 708 within the viewable area 207 and outside the three-dimensional boundary of the single UI, based on the content of the single bounded three-dimensional UI.

Figure 10:
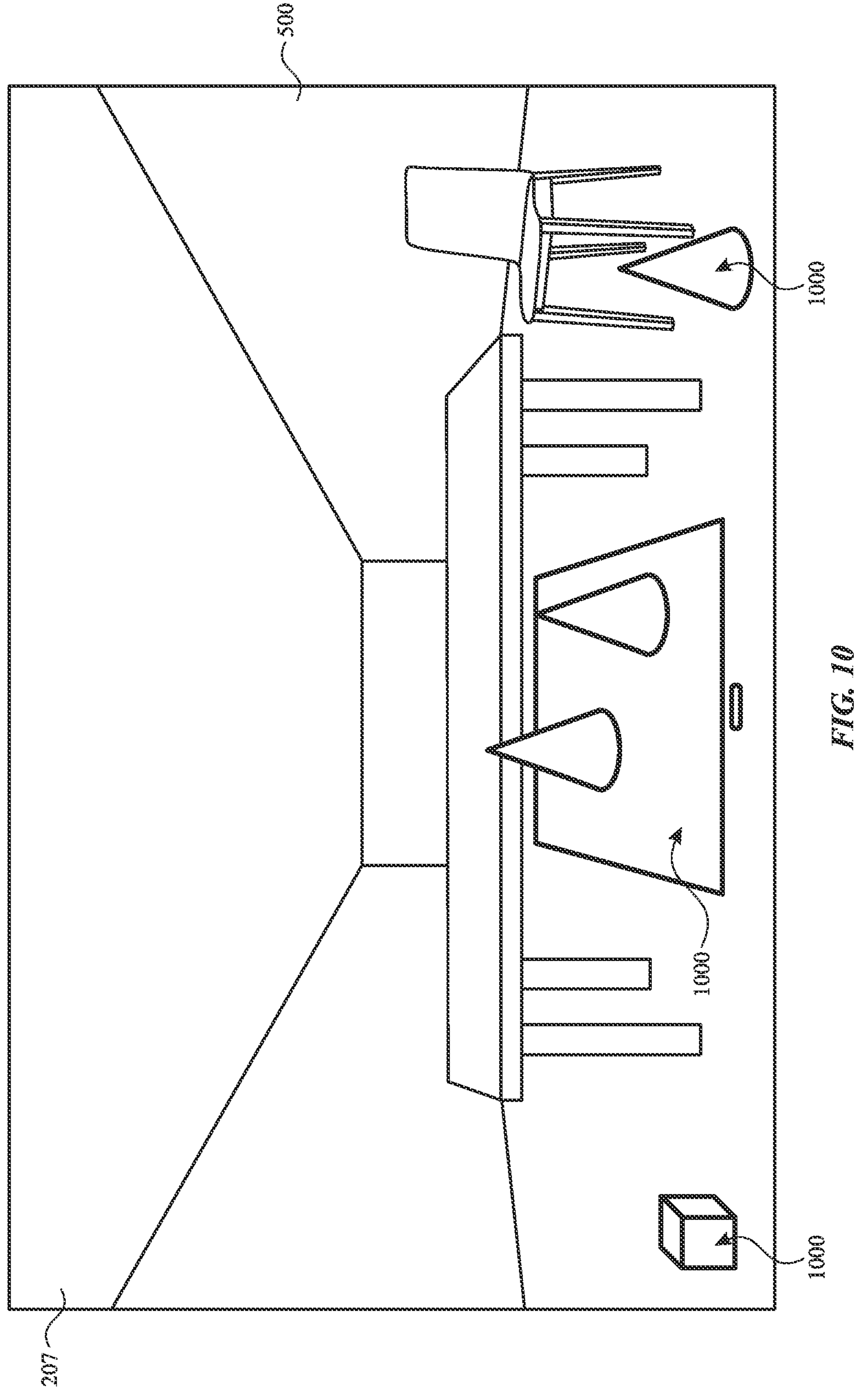
FIG. 10 illustrates an example of a full screen mixed reality user interface in which a portion of the physical environment is visible via the display in accordance with one or more implementations.

FIG. 10 illustrates an example of a full screen mixed reality (MR) user interface in which a view 500 of a portion of the physical environment is visible via the display in accordance with one or more implementations. In this example, virtual UI elements 1000 can be displayed anywhere within the viewable area 207 (e.g., to be perceivable by a user at any specified location in the physical environment). In this example, the virtual UI elements 1000 may be displayed (e.g., sized, oriented, placed, and/or anchored) based on scene content (e.g., determined based on images, detected objects, maps, etc.) describing the physical environment. As discussed herein, because the amount of scene information that may be provided to an application with a UI in a full screen UI mode (e.g., to allow the virtual UI elements 1000 to be displayed to be perceivable at any location in the physical environment) is more than the amount of scene information that is used to generate a bounded UI, the electronic device 105 may obtain the user's explicit authorization for an application to access the additional scene information before allowing an application to provide a UI in a full screen UI mode. For example, responsive to receiving the user's explicit authorization for an application to access the additional scene information, the operating system of the electronic device 105 may provide an application in a full screen UI mode with environmental light information, object planes, scenes, meshes, image tracking information, face tracking information, and/or other scene and/or user information that the application is prevented from receiving in a bounded two- or three-dimensional UI mode.

Figure 11:
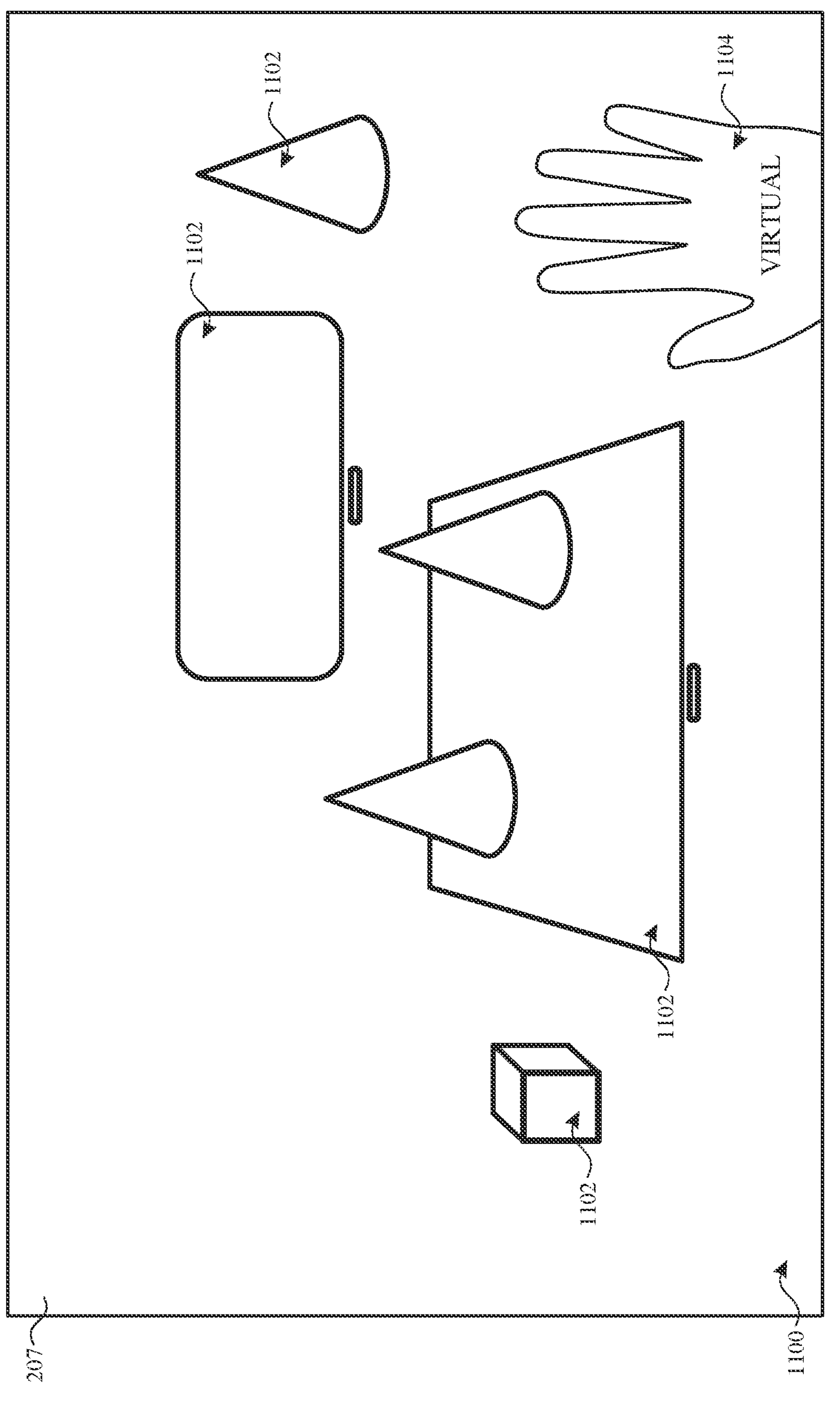
FIG. 11 illustrates an example of a full screen virtual reality user interface in which a view of the physical environment is blocked the display in accordance with one or more implementations.

FIG. 11 illustrates an example of a full screen virtual reality user interface in which a view of the physical environment is blocked by the display, in accordance with one or more implementations. As shown in FIG. 11, in a full screen virtual reality user interface mode, a user interface displayed in the viewable area 207 may include a virtual background 1100 that substantially blocks a user's view of the physical environment, and one or more virtual objects 1102. As shown, a virtual representation 1104 of the user's own hand(s) may also be displayed in the viewable area 207 of the display. The virtual representation 1104 of the user's hand may move and change with the physical movement of the user's physical hand (e.g., as determined by one or more cameras 150 and/or one or more sensors 152).

In one or more implementations, when a full screen user interface is a full screen virtual reality user interface as in the example, of FIG. 11, the electronic device 105 may provide device information corresponding to a location and/or a position of the electronic device, and hand location information corresponding to a location (e.g., and/or position) of a hand of a user of the electronic device to the application, while preventing the application from accessing scene information corresponding to the physical environment. For example, since the XR environment in the example of FIG. 11 is entirely virtual, there is no need to provide the application generating the UI with scene information for placing or anchoring virtual objects 1102 relative to the physical environment. In one or more implementations, while displaying the user interface in the full screen virtual reality user interface mode of FIG. 11, the electronic device 105 may display a view of a portion of the physical environment on the display when a location of the electronic device is at or near a user-drawn geo-fence. For example, a user of the electronic device may use gestures and/or device movement to define a region of the physical environment for use of the full screen virtual reality user interface mode, and the electronic device may pass through a view of the physical environment instead of the full screen VR user interface when the user and/or the device approach or cross out of the user-defined region.

In the examples of FIGS. 10 and 11, a full screen MR user interface and a full screen VR user interface are shown, respectively. In one or more implementations, a user interface of an application may be switchable between a bounded mode (e.g., a bounded 2D mode as in the examples of UI 204 and 214 of FIG. 5 or a bounded 3D mode as in the example of UI 226 of FIG. 6) in which the UI of the application is displayed within a 2D or 3D boundary (e.g., an UI content is clipped at the boundary) and in which UIs of other applications may be concurrently displayed, and an exclusive mode in which only the UI of that application is displayed. In the exclusive mode, the UI of the application may be free of boundaries or clipping, and may be the only UI displayed. In a bounded mode, the UI of the application may be displayed alone or concurrently with one or more UIs of one or more other applications. An exclusive mode may be a full screen MR display mode, a full screen VR display mode, or a partial VR mode in which the UI is displayed in a VR portal that covers a portion of the user's view of the physical environment while allowing the user to view another portion of the physical environment. For example, the enhancements of FIGS. 8 and 9 may be implemented as VR portals that cover a portion of the view 500 of the physical environment.

Figure 12:
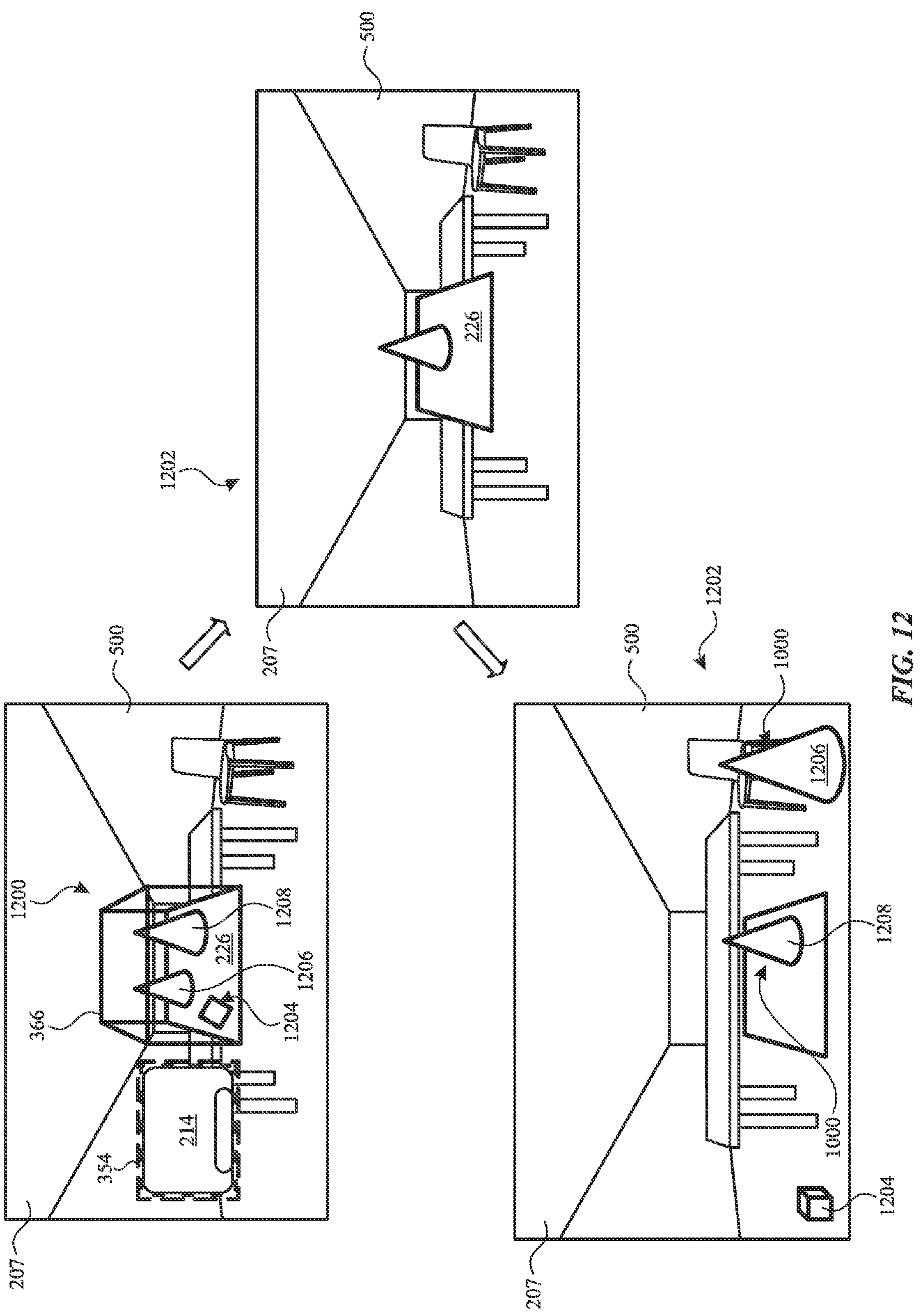
FIG. 12 illustrates an example switch of a user interface from a bounded mode to an exclusive mode in accordance with one or more implementations.

FIG. 12 illustrates an example of a use case in which a UI of an application is switched from a bounded mode to an exclusive mode, in accordance with one or more implementations. In the example of FIG. 12, UI 214 is displayed in bounded two-dimensional display mode within boundary 354, and UI 226 is concurrently displayed in a bounded three-dimensional display mode 1200 within boundary 366 (e.g., a described herein in connection with FIG. 6). As shown, the UI 226 may be switched to an exclusive mode 1202. For example, an application may provide, as part of a bounded 2D UI (e.g., the UI 214) or a bounded 3D UI (e.g., the UI 226), an option to switch to an exclusive mode for that application. Responsive to a user request to switch to the exclusive mode, the application may provide a request to a system process of the device on which the application is running, to switch the system to the exclusive mode. The system process may determine (e.g., based on other applications or processes that are running on the device, motion of the device and/or displayed content at the device, a time since a most recent mode switch, the physical environment of the device, a power status of the device, or other information) whether to allow the application to switch to the exclusive mode.

In the example of FIG. 12, the system process switches the UI 226 to the exclusive mode 1202. As shown, in the exclusive mode for the UI 226, the UI 214 is removed from the display (e.g., and the application associated with the UI 214 may remain active or can be deactivated or paused). FIG. 12 also indicates how, in the exclusive mode, the boundary 366 for the UI 226 is removed, and the UI 226 is displayed in an unbounded mode. It is appreciated that the boundary 366 of the UI 226 in the bounded 3D mode is drawn in FIG. 12, but may not be invisible to a user of the device (e.g., the boundary 366 is maintained by the device but is not displayed to the user).

In one or more implementations, the UI 226 may be initially unchanged, from the perspective of the user, when the UI 226 is switched from the bounded mode to the exclusive mode. However, as illustrated in FIG. 12, because the boundary of the UI 226 has been removed in the exclusive mode 1202, UI elements or other content of the UI 226 may be moved (e.g., by the user, such as by performing one or more gestures that are detected by the device) to appear anywhere in the physical environment. In the example of FIG. 12, the exclusive mode 1202 is implemented as a full screen MR mode in which a view 500 of a portion of the physical environment is visible via the display. In this example, UI elements 1204, 1206, and 1208 can be displayed anywhere within the viewable area 207 (e.g., to be perceivable by a user at any specified location in the physical environment) of the display (and/or even to locations that are not within the viewable area, to be displayed when the viewable area is moved to include those locations). In this example, the UI elements 1204, 1206, and 1208 may be displayed (e.g., sized, oriented, placed, and/or anchored) based on scene content (e.g., determined based on images, detected objects, maps, etc.) describing the physical environment. In the example of FIG. 12, a UI element 1204 that is displayed in two dimensions in the bounded mode of the UI 226 may be expanded into three dimensions and placed to appear as though at a location in the physical environment in the exclusive mode. As another example, the UI element 1206 may be expanded to a larger size and placed to appear as though at a location the physical environment in the exclusive mode.

Because the amount of scene information and/or user information that may be provided to an application with a UI in an exclusive mode (e.g., to allow the virtual UI elements 1000 to be displayed, moveable, and/or resizable to be perceivable at any location and/or orientation in the physical environment) is more than the amount of information that is provided to a UI in a bounded UI mode, the electronic device 105 may obtain the user's explicit authorization for an application to access the additional scene information and/or user information before allowing an application move UI content beyond the original boundaries of the bounded UI. For example, responsive to receiving the user's explicit authorization for an application to access the additional scene information and/or user information, the operating system of the electronic device 105 may provide an application in an exclusive mode with environmental light information, object planes, scenes, meshes, image tracking information, face tracking information, gesture information, and/or other scene and/or user information that the application is prevented from receiving in a bounded two-dimensional or three-dimensional UI mode.

In the example of FIG. 12, a switch from a bounded 3D mode to an exclusive mode is illustrated. However, in other use cases, a switch from a bounded 2D mode to an exclusive mode may also be performed. In one example use case, a user may be viewing a 2D UI view of a catalog of products for sale in the UI 214 (e.g., a bounded 2D UI), and may switch to an exclusive mode. In one or more implementations, the user's view of the UI 214 may be unchanged, but the functionality of the UI may be updated so that the user can use gestures to virtually pull a two-dimensional image of a product from the catalog, expand the product into three dimensions, and/or virtually size and/or place the product to appear to the user to be at any location and/or orientation within the physical environment.

In one or more implementations, when a UI of an application is switched to an exclusive mode, an operating system of the device on which the application is running and with which the UI is displayed may assign a new coordinate origin to a location of the user. For example, in a bounded mode, an origin of a coordinate system that the application can use to place UI elements may be located at a corner of the boundary of the bounded UI. When a switch to the exclusive mode occurs, the system process of the electronic device may set the coordinates (0, 0, 0) of the origin of a coordinate system around the user to a location of the user (e.g., at or near the user's feet). For example, the location of the user may be determined using one or more sensors of the device displaying the UI. In one or more implementations, the location of the user may not be available for display of UI elements in the bounded mode. In this way, the application can be provided with the ability to place UI elements at desired locations around the user, even without (in some implementations) receiving information about the user's location in the environment. In one or more use cases, one or more other users of one or more other devices may be participating in a joint interaction with the UI in the exclusive mode. In these example use cases, one or more avatars of the one or more other users may be displayed at locations that are offset from the origin provided to the application for the exclusive mode, and offset from each other.

In one or more implementations, an application (e.g., application 402) underlying the UI 226 may animate transitions (e.g., transitions from fewer to more dimensions, transitions from more to fewer dimensions, translations, rotations, and/or resizing or scaling) of UI elements, such as UI elements 1204 and 1208 in the exclusive mode. In one or more implementations, a device (e.g., the electronic device 105) may include an exit mechanism for exiting an exclusive mode or other full screen mode. For example, actuating a virtual control element displayed in the exclusive or full screen mode, or actuating a physical control element (e.g., a button) may cause the operating system of the device to exit the exclusive or full screen mode and revert the UI of the application to a bounded mode. In one or more implementations, the operating system may prevent the application from animating content during the transition out of the exclusive mode or other full screen mode.

In one or more implementations, upon switching to the exclusive mode, a system process may modify one or more operating characteristics of the electronic device (e.g., by modifying operations of one or more noise-generating components of the electronic device such as speakers or fans, modifying a frame rate or refresh rate of a display, and/or add activating or deactivating display of a representation of a user's hand).

Figure 13:
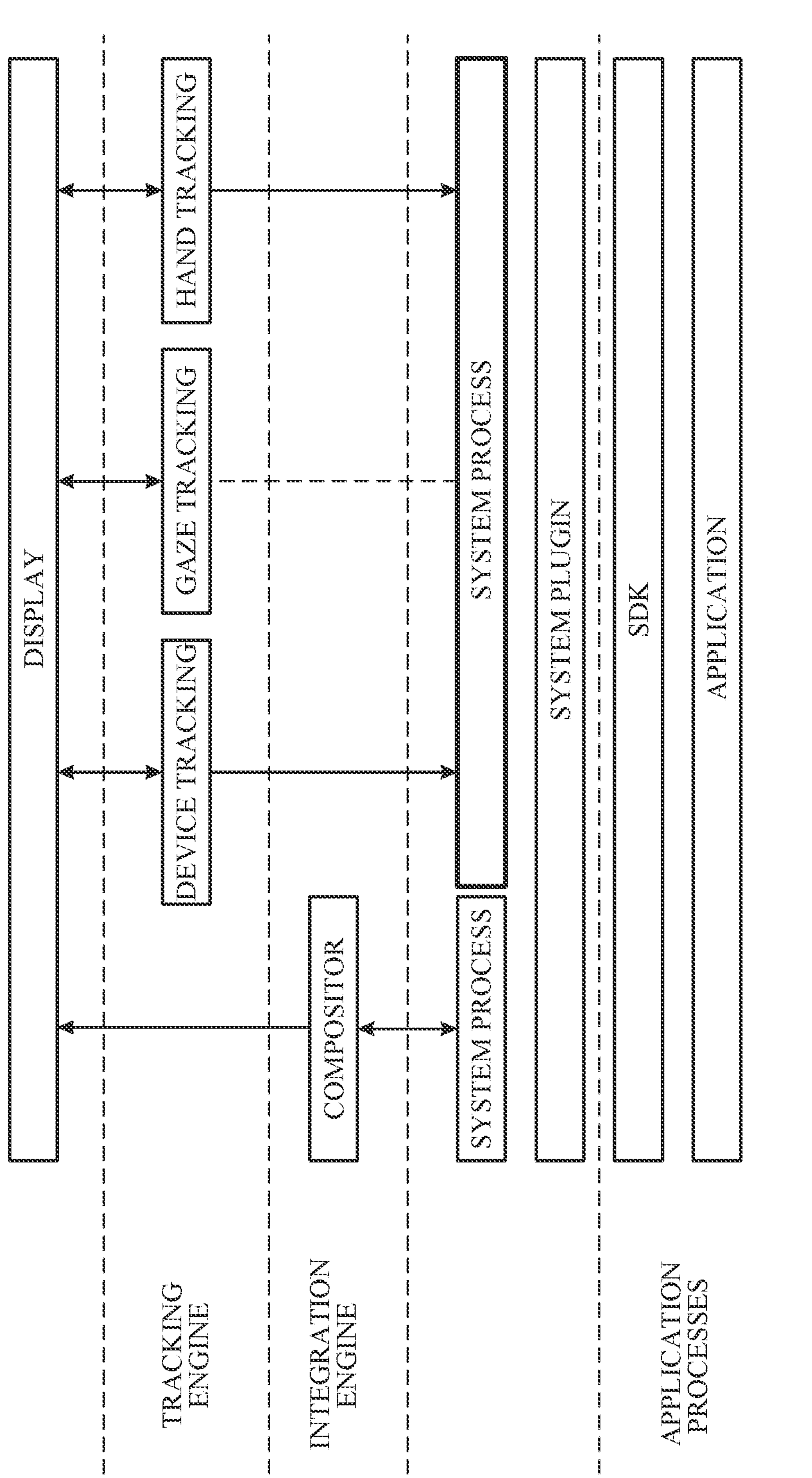
FIG. 13 illustrates a block diagram of an example architecture for operating a cross-platform virtual reality application in accordance with one or more implementations.

In one or more implementations, an application may be a full screen virtual reality only application, configured for use across multiple platforms (e.g., a cross-platform virtual reality application). FIG. 13 illustrates a block diagram of an example architecture for operating a cross-platform virtual reality application (e.g., with the electronic device 105) in accordance with one or more implementations. In one or more implementations, a cross-platform virtual reality application running on the electronic device 105 may be provided, by the operating system of the electronic device, with access to a display buffer for rendering display frames and access to user hand information and/or device pose information. In one or more implementations, a cross-platform virtual reality application running on the electronic device 105 may be prevented (e.g., by the operating system of the electronic device) from receiving scene information, such as pass-through video and/or scene mapping and/or detected object information. In one or more implementations, a cross-platform virtual reality application running on the electronic device 105, may be prevented (e.g., by the operating system of the electronic device) from receiving system-detected gestures, and may instead identify hand gestures within the application using hand information received from the operating system. In one or more implementations, one or more external control devices (e.g., gaming controls) may be used to provide user inputs to the cross-platform virtual reality application via the electronic device 105.

As indicated in FIG. 13, an application may interact with an integration engine (e.g., including a compositor) for display operations, and a tracking engine (e.g., including a device tracker for providing device pose information, a gaze tracker for providing user gaze information, and a hand tracker for providing hand location and/or position information). For example, the application may interact with the tracking engine via an application software development kit (SDK), a system plugin, and a first system process for frame pacing and display access. In this example, the application may interact with the integration engine via the application software development kit (SDK), the system plugin, and a second system process for obtaining device and hand pose information.

Figure 14:
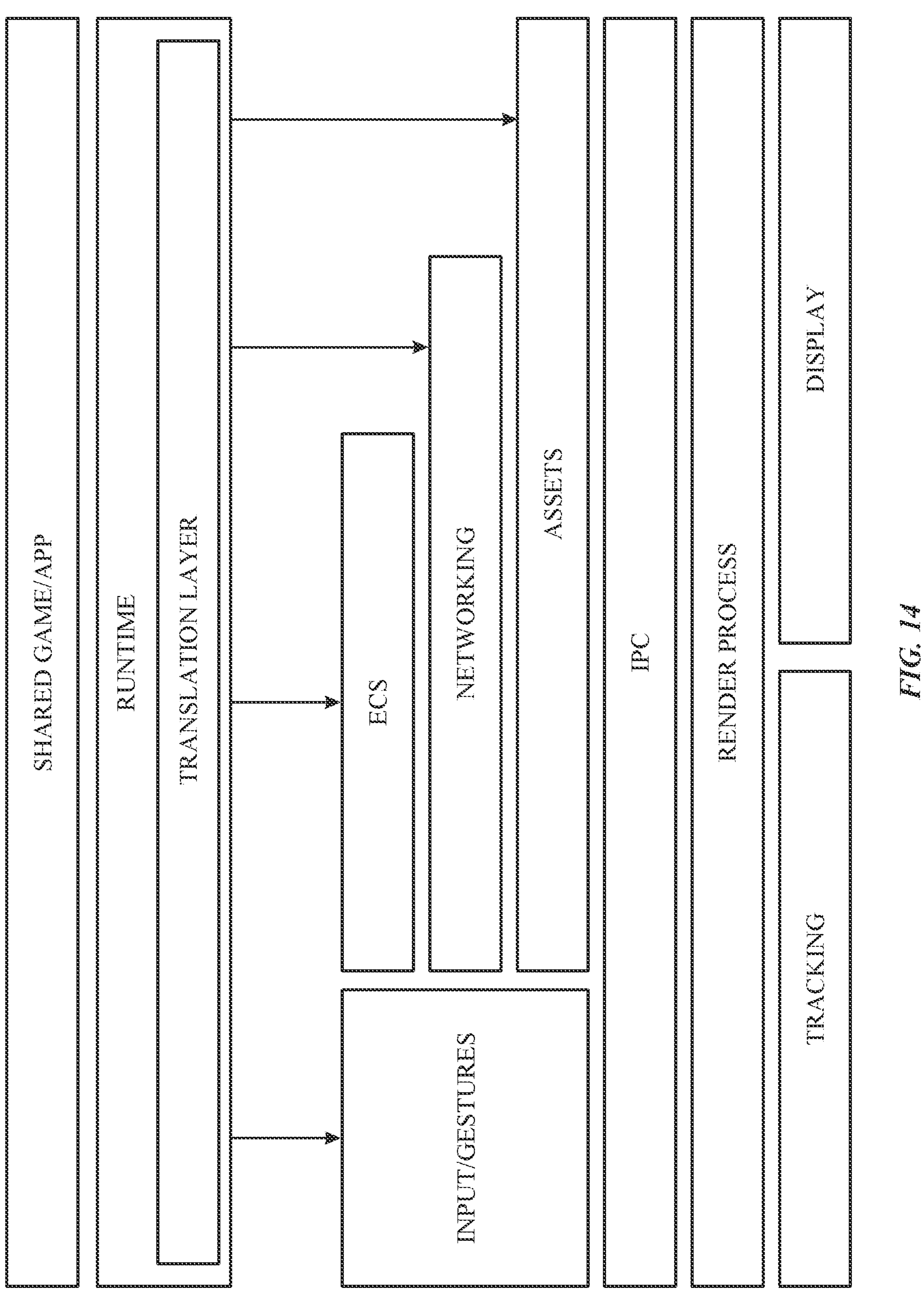
FIG. 14 illustrates a block diagram of an example architecture for operating a third party application in accordance with one or more implementations.

In one or more implementations, a third party application (e.g., an application developed by a developer other than the developer of the electronic device 105 and/or the operating system thereof) may be run on the electronic device 105 (e.g., alongside other open applications in full screen or bounded scenes). FIG. 14 illustrates a block diagram of an example architecture for operating a third party application in accordance with one or more implementations.

For example, a third party application developer may develop an application using the application developer's toolset, for deployment to the electronic device [150] 105. As illustrated in FIG. 14, at runtime (e.g., on the electronic device 105), an application translation layer may convert the application developer's tools to system entities for the operating system of the electronic device 105. A system process, such as a system Entity-Component-System (ECS) layer, a system network layer, and/or a system assets layer may process and/or provide the system entities to a system rendering process that may render application content corresponding to the translated system entities from the application, for display. For example, the system processes of the electronic device 105 may provide application programming interfaces (APIs) for an application developer to build a translation layer at the application's game object or ECS level, to translate application content into system representations. An application development platform may also expose different knobs for developers based on platform differences of various platforms for deployment of an application.

Figure 15:
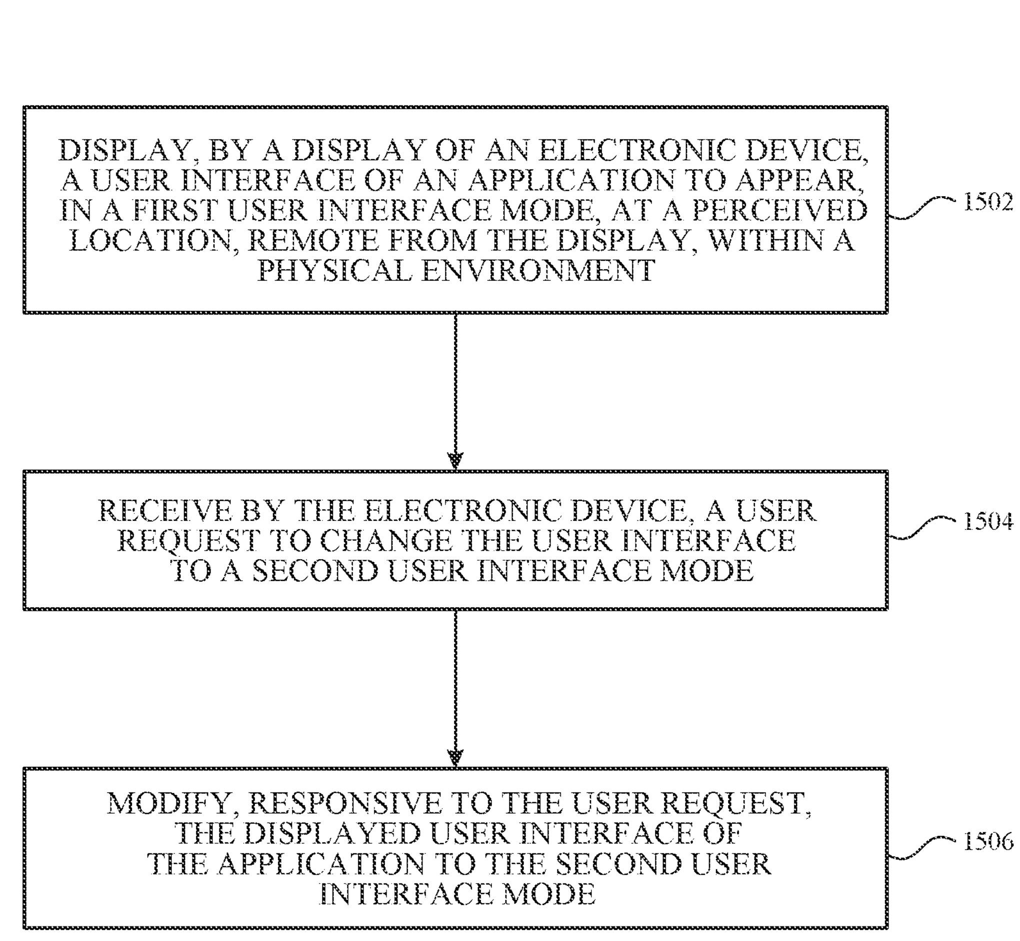
FIG. 15 illustrates a flow diagram of an example process for providing various user interface modes according to aspects of the subject technology.

FIG. 15 illustrates a flow diagram of an example process 1500 for providing multiple user interface modes for a user interface of an application in accordance with implementations of the subject technology. For explanatory purposes, the process 1500 is primarily described herein with reference to the electronic device 105 of FIG. 1. However, the process 1500 is not limited to the electronic device 105 of FIG. 1, and one or more blocks (or operations) of the process 1500 may be performed by one or more other components of other suitable devices, including the electronic device 104, the electronic device 110, and/or the electronic device 115. Further for explanatory purposes, some of the blocks of the process 1500 are described herein as occurring in serial, or linearly. However, multiple blocks of the process 1500 may occur in parallel. In addition, the blocks of the process 1500 need not be performed in the order shown and/or one or more blocks of the process 1500 need not be performed and/or can be replaced by other operations.

As illustrated in FIG. 15, at block 1502, a display (e.g., display 230) of an electronic device (e.g., electronic device 105) may display a user interface (e.g., UI 204) of an application (e.g., application 402) to appear, in a first user interface mode, at a perceivable location (e.g., physical anchor location 205), remote from the display, within a physical environment (e.g., physical environment 200). For example, the electronic device may render a representation 304 of the UI 204 in the first user interface mode and display the representation 304 on the display 230 to appear to be located at a desired three-dimensional location in the physical environment (e.g., as described herein in connection with FIG. 3). For example, by adjusting the relative positions of a right-eye portion of the representation 304 and a left eye portion of the representation 304, the electronic device 105 can control the depth at which the UI 204 appears, remote from the electronic device 105 in the physical environment, to the user.

In one or more implementations, displaying the user interface of the application to appear at the perceivable location within a physical environment may include receiving user interface information (e.g., application data as described herein in connection with FIG. 4) for the user interface at the system process from the application in system units (e.g., non-physical digital units), and determining a scaling between the system units and physical units in the physical environment, based in part on the scene information for the physical environment. For example, the system process may determine, based on a location for the display of the UI 204, and/or other physical and/or virtual content in the vicinity of the UI 204, a scaling between the system units and the physical units, to display the UI 204 at a desired perceivable location, orientation, and/or size. This use of system units by the application can facilitate, for example, the OS service 400 allowing the user to pull the UI 204 closer, move the UI 204 further away, and/or switch between user interface modes (e.g., without requiring processing operations by the application, in some implementations).

At block 1504, the electronic device may receive a user request to change the user interface to a second user interface mode. The user request may be, as examples, a voice request, a gesture-based request, or a request provided via any input interface of the electronic device.

At block 1506, the electronic device may modify, responsive to the user request, the displayed user interface of the application to the second user interface mode. In one or more implementations, the first user interface mode is a bounded two-dimensional mode of operation (e.g., as in the example of UI 204, UI 214, and/or UI window 700) and the second user interface mode is a bounded partial three-dimensional mode of operation (e.g., as in the example of UI window 704 of FIG. 7). In one or more implementations, the first user interface mode is a bounded two-dimensional mode of operation (e.g., as in the example of UI 204, UI 214, and/or UI window 700) and the second user interface mode is a bounded three-dimensional display mode (e.g., as in the example of UI 226).

In one or more implementations, in the first user interface mode, the user interface (e.g., UI 204 or UI 226) is displayed within a boundary (e.g., a two-dimensional boundary such as boundary 344, or a three-dimensional boundary such as boundary 366) and concurrently with at least one other user interface (e.g., UI 214) of at least one other application within at least one other boundary (e.g., boundary 354). In one or more implementations, in the second user interface mode, the user interface is displayed within the boundary and is the only user interface displayed by the display of the electronic device (e.g., as in the examples of FIGS. 7, 8, and 9). For example, a user may close or minimize the other displayed UI, or may switch the user interface to an exclusive mode.

In one or more implementations, the process 1400 may also include, while displaying the user interface in the second user interface mode, determining, by an operating system process of the electronic device, a characteristic of content displayed in the user interface. For example, the characteristic may be a color, a mood, a theme, an action, a character, or other characteristic of the content. In one or more implementations, the process 1400 may also include, while displaying the user interface in the second user interface mode, modifying, by the operating system process, a portion of a display area (e.g., viewable area 207) outside the boundary of the user interface based on the determined characteristic (e.g., by displaying an enhancement 708 as described herein in connection with FIGS. 7, 8, and 9).

In one or more implementations, in the first user interface mode and the second user interface mode, the boundary is a two-dimensional boundary (e.g., a two-dimensional boundary such as boundary 344 or 354). In one or more implementations, in the first user interface mode and the second user interface mode, the boundary is a three-dimensional boundary (e.g., a three-dimensional boundary such as boundary 366).

In one or more implementations, in the second user interface mode, the user interface is a full screen user interface (e.g., a full screen MR interface or a full screen VR interface).

For example, in one or more implementations, the full screen user interface may be a full screen mixed reality user interface in which a portion of the physical environment is visible via the display (e.g., as described herein in connection with FIG. 10 and/or FIG. 12).

In one or more implementations, modifying the displayed user interface of the application to the second user interface mode responsive to the user request at block 1506 may include switching the displayed user interface of the application to the second user interface mode responsive to the user request. In one or more implementations, the first user interface mode is a bounded mode (e.g., a bounded 2D display mode or a bounded 3D display mode) and the second user interface mode is an exclusive mode (e.g., as described herein in connection with FIG. 12). For example, the bounded mode may be a bounded two-dimensional display mode or a bounded three-dimensional display mode, and the exclusive mode may be an unbounded mode (e.g., a mode in which only UI elements of the user interface are displayed by the display, and in which the UI elements of the user interface can be moved to any location without clipping).

In one or more implementations, another user interface of another application may be displayed in a bounded mode concurrently with the display of the user interface of the application in the bounded mode (e.g., as shown in connection with the bounded mode 1200 of FIG. 12), and the other user interface may be removed from the display responsive to the switch of the user interface to the exclusive mode (e.g., as shown in connection with the exclusive mode 1202 of FIG. 12).

In one or more implementations, switching the displayed user interface to the exclusive mode may include providing a first origin for the user interface that is different from a second origin for the user interface in the bounded mode. For example, the first origin may be a user-centric origin, such as an origin located at or near the user's feet, and the second origin may be an interface-specific origin that is located relative to the location of another displayed user interface or a location of another object in the physical environment that is known to an operating system of the electronic device but not to the application.

In one or more implementations, the process 1500 may also include receiving, at a system process (e.g., an operating system process, such as the OS service 400) of the electronic device, a request to exit the exclusive mode, and switching the user interface from the exclusive mode (e.g., by re-displaying another user interface of another application that was displayed prior to entering the exclusive mode, and/or by restoring and/or updating a boundary of for the user interface) to the bounded mode while preventing animations by the application during the switch from the exclusive mode to the bounded mode.

Figure 16:
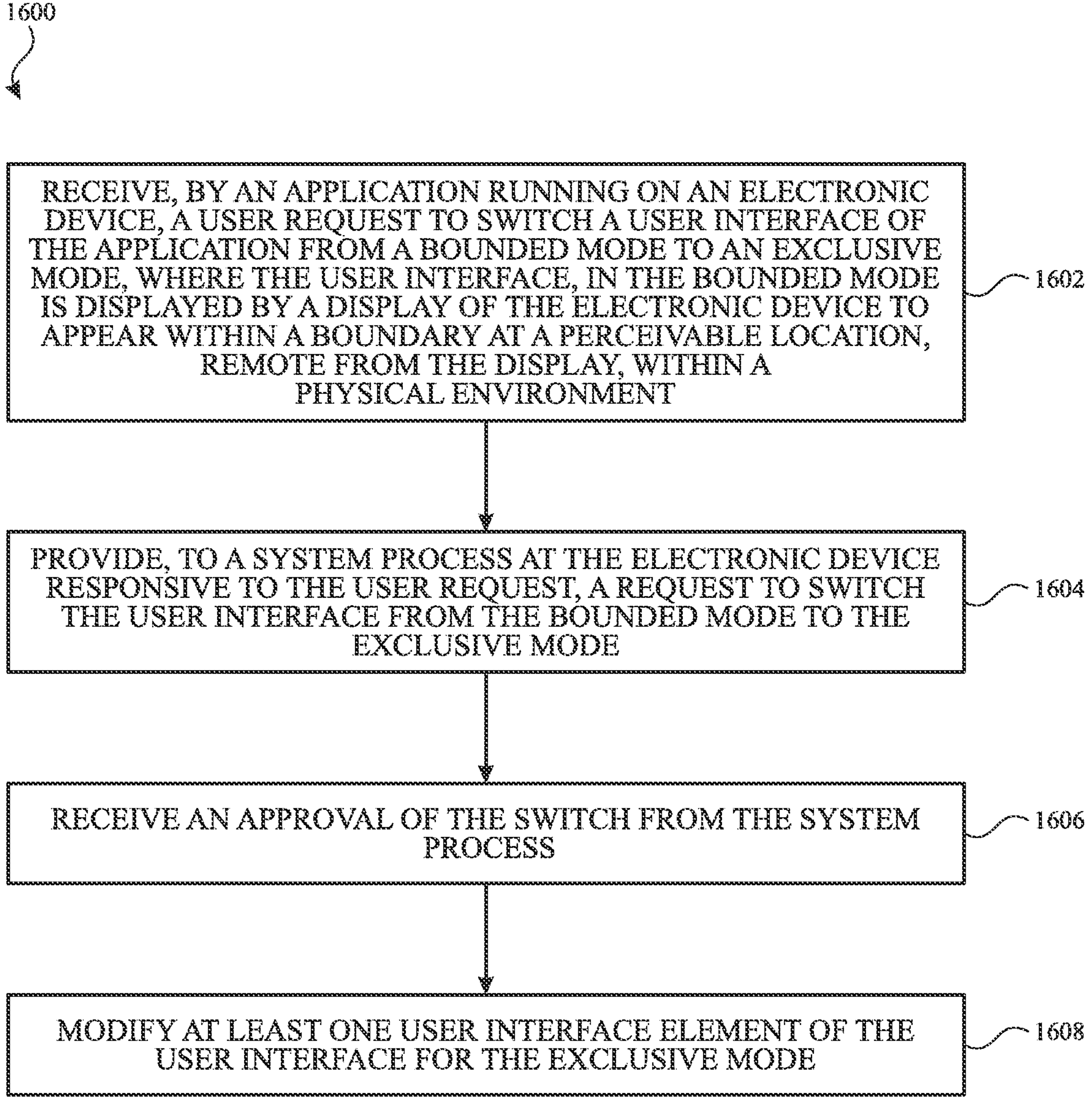
FIG. 16 illustrates a flow diagram of an example process that may be performed by an application for providing various user interface modes according to aspects of the subject technology.

FIG. 16 illustrates a flow diagram of an example process 1600 that may be performed by an application in accordance with implementations of the subject technology. For explanatory purposes, the process 1600 is primarily described herein with reference to the electronic device 105 of FIG. 1. However, the process 1600 is not limited to the electronic device 105 of FIG. 1, and one or more blocks (or operations) of the process 1600 may be performed by one or more other components of other suitable devices, including the electronic device 104, the electronic device 110, and/or the electronic device 115. Further for explanatory purposes, some of the blocks of the process 1600 are described herein as occurring in serial, or linearly. However, multiple blocks of the process 1600 may occur in parallel. In addition, the blocks of the process 1600 need not be performed in the order shown and/or one or more blocks of the process 1600 need not be performed and/or can be replaced by other operations.

As illustrated in FIG. 16, at block 1602, an application (e.g., application 402) running on an electronic device (e.g., electronic device 105), may receive a user request to switch a user interface of the application from a bounded mode to an exclusive mode. The user interface, in the bounded mode, may be displayed by a display (e.g., display 230) of the electronic device to appear within a boundary (e.g., a boundary 344, a boundary 354, a boundary 366) at a perceivable location, remote from the display, within a physical environment. For example, the user interface may include a control element (e.g., a user interface element representing a button or switch) that can be accessed by the user (e.g., via a user gesture) to request a mode switch.

At block 1604, the application may provide, to a system process (e.g., XR server 400) at the electronic device responsive to the user request, a request to switch the user interface from the bounded mode to the exclusive mode. In one or more implementations, in the exclusive mode, the user interface may be a full screen mixed reality user interface. In one or more other implementations, in the exclusive mode, the user interface may be a full screen virtual reality user interface or a full screen mixed reality user interface with a virtual reality portal.

At block 1606, the application may receive an approval of the switch from the system process. For example, the system process may approve the switch if other displayed content does not prohibit a switch to an exclusive mode, motion of the device and/or display content is below a motion threshold, and/or if a minimum period of time has passed since a last switch (as examples).

At block 1608, the application may modify at least one user interface element of the user interface for the exclusive mode. For example, modifying the at least one user interface element may include replacing the at least one user interface element with a controllable user interface element that is moveable to locations outside the boundary of the bounded mode. In one or more implementations, the application may receive a user gesture input requesting to move the controllable user interface element to a location outside a boundary that was used to clip the user interface in the bounded mode, and the application may animate a move of the controllable user interface element to the location. In one or more implementations, a user interface may also include a controllable user interface element in the bounded mode. However, in the bounded mode, a controllable user interface element may only be moveable and/or resizable to within a clipping boundary.

In one or more implementations, the application can receive a user request to modify the controllable user interface element from a two-dimensional user interface element (e.g., the user interface element 1204) to a three-dimensional user interface element, and modify, responsive to the user request, the controllable user interface element from the two-dimensional user interface element to the three-dimensional user interface element (e.g., as illustrated in FIG. 12). For example, the user may perform a gesture to pull an two-dimensional image from the user interface, and the application may modify an animation of a transition from the two-dimensional image to three-dimensional virtual object.

In one or more implementations, modifying the at least one user interface element may include modifying the at least one user interface element and/or other portion(s) of the user interface to include an indication of the switch to the exclusive mode. In one or more other implementations, following the switch (and prior to modification of any of the user interface elements after the switch), the user interface and/or the user interface elements thereof may appear identical to the appearance of the user interface and/or the user interface elements prior to the switch (e.g., in the bounded mode). For example, prior to the modification of the controllable user interface element, the controllable user interface element may be displayed to appear identical to the at least one user interface element in the bounded mode. In these implementations, the boundary of the bounded mode may have been removed in a way that is invisible to the user (e.g., until the user successfully modifies the user interface to expand beyond the prior boundary).

In one or more implementations in which the full screen user interface is a full screen mixed reality user interface, the process 1500 may also include, while displaying the user interface in the first user interface mode, providing scene information and gesture information from within the boundary to the application and preventing scene information and gesture information from outside the boundary from being provided to the application. In this example, the process 1400 may also include, while displaying the user interface in the second user interface mode, providing the scene information and gesture information from a portion of the physical environment that was outside the boundary of the user interface in the first user interface mode, to the application. In one or more implementations, prior to providing the scene information and gesture information from the portion of the physical environment that was outside the boundary of the user interface in the first user interface mode to the application, the electronic device may request user authorization to enter the second user interface mode. The electronic device may then receive the user authorization at the electronic device. The electronic device may then provide the scene information and gesture information from the portion of the physical environment that was outside the boundary of the user interface in the first user interface mode to the application responsive to receiving the user authorization. In a case in which the user authorization is not received, the application may be prevented from providing the full screen UI and/or from receiving the scene information and gesture information from outside the boundary of the user interface in the first user interface mode to the application.

As another example, in one or more implementations, the full screen user interface may be a full screen virtual reality user interface in which a view of the physical environment is blocked by the display (e.g., as described herein in connection with FIG. 11). In one or more implementations, the process 1400 may also include, while displaying the full screen virtual reality user interface, providing device information corresponding to a location and/or a position of the electronic device and hand location information corresponding to a location of a hand of a user of the electronic device to the application while preventing the application from accessing scene information corresponding to the physical environment. In one or more implementations, the process 1400 may also include, while displaying the user interface in the second user interface mode, displaying a view of a portion of the physical environment on the display when a location of the electronic device is at or near a user-drawn geo-fence. For example, the user may use a hand gesture or may move the electronic device to define a region of the physical environment for use of the electronic device in a full screen VR mode, and the electronic device may fully or partially exit the full screen VR mode when the device approaches or exits the region.

As described above, aspects of the subject technology may include the collection of data. The present disclosure contemplates that in some instances, this collected data may include personal information data that uniquely identifies or can be used to identify a specific person. Such personal information data can include demographic data, location-based data, online identifiers, telephone numbers, email addresses, home addresses data, image data, audio data, environment data, or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for providing various user interface modes of a user interface of an application running on an electronic device. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of providing various user interface modes of a user interface of an application running on an electronic device, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 17:
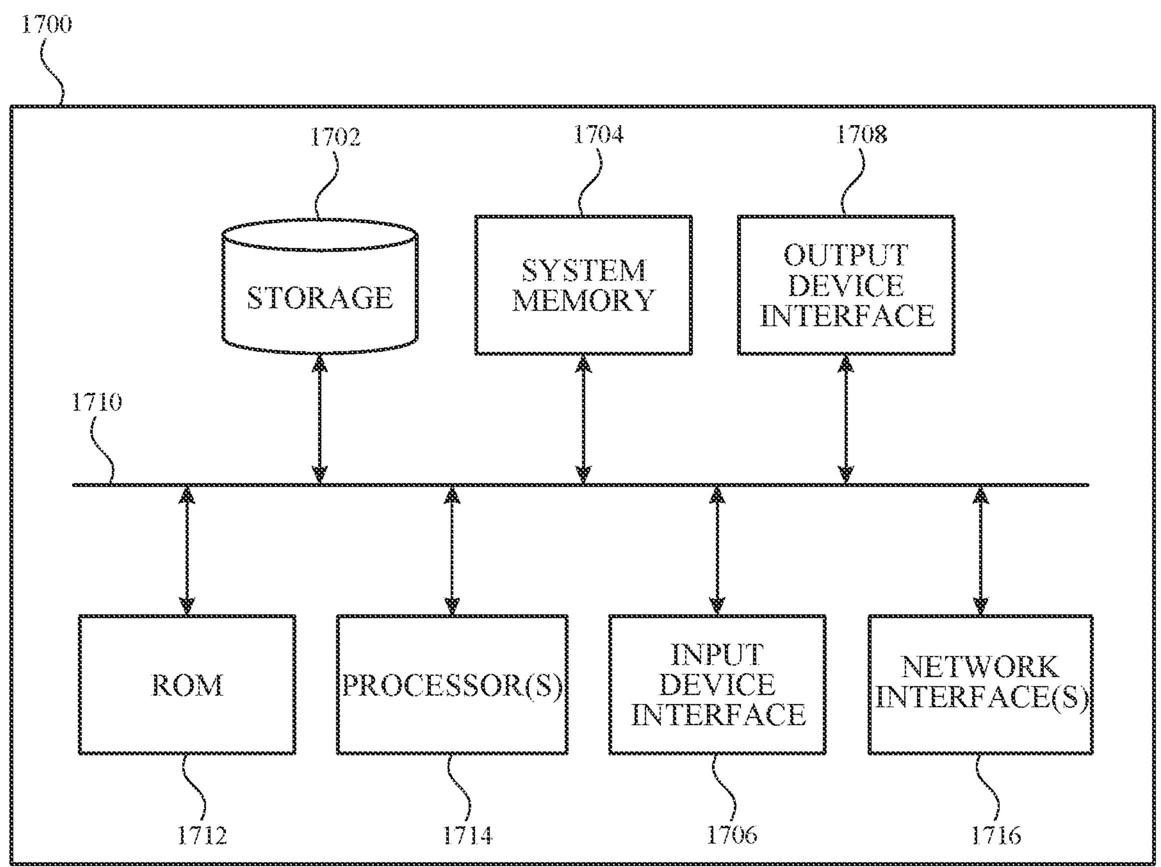
FIG. 17 illustrates an example computing device with which aspects of the subject technology may be implemented.

FIG. 17 illustrates an example computing device with which aspects of the subject technology may be implemented in accordance with one or more implementations. The computing device 1700 can be, and/or can be a part of, any computing device or server for generating the features and processes described above, including but not limited to a laptop computer, a smartphone, a tablet device, a wearable device such as a goggles or glasses, and the like. The computing device 1700 may include various types of computer readable media and interfaces for various other types of computer readable media. The computing device 1700 includes a permanent storage device 1702, a system memory 1704 (and/or buffer), an input device interface 1706, an output device interface 1708, a bus 1710, a ROM 1712, one or more processing unit(s) 1714, one or more network interface(s) 1716, and/or subsets and variations thereof.

The bus 1710 collectively represents all system, peripheral, and chipset buses that communicatively connect the numerous internal devices of the computing device 1700. In one or more implementations, the bus 1710 communicatively connects the one or more processing unit(s) 1714 with the ROM 1712, the system memory 1704, and the permanent storage device 1702. From these various memory units, the one or more processing unit(s) 1714 retrieves instructions to execute and data to process in order to execute the processes of the subject disclosure. The one or more processing unit(s) 1714 can be a single processor or a multi-core processor in different implementations.

The ROM 1712 stores static data and instructions that are needed by the one or more processing unit(s) 1714 and other modules of the computing device 1700. The permanent storage device 1702, on the other hand, may be a read-and-write memory device. The permanent storage device 1702 may be a non-volatile memory unit that stores instructions and data even when the computing device 1700 is off. In one or more implementations, a mass-storage device (such as a magnetic or optical disk and its corresponding disk drive) may be used as the permanent storage device 1702.

In one or more implementations, a removable storage device (such as a floppy disk, flash drive, and its corresponding disk drive) may be used as the permanent storage device 1702. Like the permanent storage device 1702, the system memory 1704 may be a read-and-write memory device. However, unlike the permanent storage device 1702, the system memory 1704 may be a volatile read-and-write memory, such as random access memory. The system memory 1704 may store any of the instructions and data that one or more processing unit(s) 1714 may need at runtime. In one or more implementations, the processes of the subject disclosure are stored in the system memory 1704, the permanent storage device 1702, and/or the ROM 1712. From these various memory units, the one or more processing unit(s) 1714 retrieves instructions to execute and data to process in order to execute the processes of one or more implementations.

The bus 1710 also connects to the input and output device interfaces 1706 and 1708. The input device interface 1706 enables a user to communicate information and select commands to the computing device 1700. Input devices that may be used with the input device interface 1706 may include, for example, alphanumeric keyboards and pointing devices (also called "cursor control devices"). The output device interface 1708 may enable, for example, the display of images generated by computing device 1700. Output devices that may be used with the output device interface 1708 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 17, the bus 1710 also couples the computing device 1700 to one or more networks and/or to one or more network nodes through the one or more network interface(s) 1716. In this manner, the computing device 1700 can be a part of a network of computers (such as a LAN, a wide area network ("WAN"), or an Intranet, or a network of networks, such as the Internet. Any or all components of the computing device 1700 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components (e.g., computer program products) and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation.

Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:

displaying, by a display of an electronic device, a user interface of an application to appear, in a first user interface mode, at a perceivable location, remote from the display, within a physical environment;

receiving, by the electronic device, a user request to change the user interface to a second user interface mode; and modifying, responsive to the user request, the displayed user interface of the application to the second user interface mode, wherein the first user interface mode comprises one of a bounded three-dimensional display mode, in which user interface elements of the user interface are constrained, by a system process at the electronic device, to be displayed within a boundary that is assigned, by the system process, to the application and that defines a portion of the physical environment including the perceivable location, or an unbounded mode, in which the user interface elements of the user interface can be moved to locations outside the boundary and within the physical environment, and wherein the second user interface mode comprises the other of the bounded three-dimensional display mode or the unbounded mode.

2. The method of claim 1, further comprising displaying the user interface in a bounded two-dimensional display mode.

3. The method of claim 1, wherein, in the bounded three-dimensional display mode, the user interface is displayed within the boundary and concurrently with at least one other user interface of at least one other application within at least one other boundary.

4. The method of claim 3, wherein, in the unbounded mode, the user interface is the only user interface displayed by the display of the electronic device.

5. The method of claim 4, further comprising, while displaying the user interface in the unbounded mode:

determining, by the system process of the electronic device, a characteristic of content displayed in the user interface; and modifying, by the system process, a portion of a display area outside the boundary of the user interface based on the determined characteristic.

6. The method of claim 5, wherein, in the bounded three-dimensional display mode, the boundary is a three-dimensional boundary.

7. The method of claim 3, wherein in the unbounded mode, the user interface is a full screen user interface.

8. The method of claim 7, wherein the full screen user interface is a full screen mixed reality user interface in which a portion of the physical environment is visible via the display.

9. The method of claim 8, further comprising, while displaying the user interface in the bounded three-dimensional display mode, providing scene information and gesture information from within the boundary to the application and preventing scene information and gesture information from outside the boundary from being provided to the application.

10. The method of claim 9, further comprising, while displaying the user interface in the unbounded mode, providing the scene information and gesture information from a region of the physical environment that was outside the boundary of the user interface in the bounded three-dimensional display mode to the application.

11. The method of claim 10, further comprising, prior to providing the scene information and gesture information from the region of the physical environment that was outside the boundary of the user interface in the bounded three-dimensional display mode to the application:

requesting, by the electronic device, user authorization to enter the unbounded mode; and receiving the user authorization at the electronic device.

12. The method of claim 7, wherein the first user interface mode comprises one of the bounded three-dimensional display mode, the unbounded mode in which the user interface is the full screen user interface, or another unbounded mode in which the user interface is another full screen user interface, wherein the other full screen user interface is a full screen virtual reality user interface in which a view of the physical environment is blocked by the display.

13. The method of claim 12, further comprising, while displaying the full screen virtual reality user interface, providing device information corresponding to a location and/or a position of the electronic device and hand location information corresponding to a location of a hand of a user of the electronic device to the application while preventing the application from accessing scene information corresponding to the physical environment.

14. The method of claim 12, further comprising, while displaying the user interface in the other unbounded mode, displaying a view of a portion of the physical environment on the display when a location of the electronic device is at or near a user-drawn geo-fence.

15. A device, comprising:

a memory; and one or more processors configured to:

display, by a display of the device, a user interface of an application to appear, in a first user interface mode, at a perceivable location, remote from the display, within a physical environment;

receive a user request to change the user interface to a second user interface mode;

switch, responsive to the user request, the displayed user interface of the application to the second user interface mode, wherein the first user interface mode comprises one of a bounded two-dimensional mode, in which two-dimensional user interface elements of the user interface are constrained, by a system process at the device, to be displayed within a two-dimensional boundary that is assigned, by the system process, to the application and that defines a two-dimensional portion of the physical environment including the perceivable location, or a bounded three-dimensional mode, in which three-dimensional user interface elements of the user interface are constrained, by the system process, to be displayed within a three-dimensional boundary that is assigned, by the system process, to the application and that defines a three-dimensional portion of the physical environment including the perceivable location, and wherein the second user interface mode comprises the other of the bounded two-dimensional mode or the bounded three-dimensional mode;

display another user interface of another application in a bounded mode concurrently with the display of the user interface of the application in the bounded two-dimensional mode or the bounded three-dimensional mode;

switch from the first user interface mode or the second user interface mode to an exclusive mode; and remove the other user interface from the display responsive to the switch of the user interface to the exclusive mode.

16. The device of claim 15, wherein the one or more processors are configured to:

receive, at a system process, a request to exit the exclusive mode; and switch the user interface from the exclusive mode to a bounded mode while preventing animations by the application during the switch from the exclusive mode to the bounded mode.

17. The device of claim 15, wherein the one or more processors are configured to switch the displayed user interface to the exclusive mode, in part, by providing a first origin for the user interface that is different from a second origin for the user interface in the bounded two-dimensional mode or the bounded three-dimensional mode.

18. The device of claim 17, wherein the exclusive mode comprises an unbounded mode.

19. A non-transitory computer-readable medium storing instructions that, when executed by one or more processors, cause the one or more processors to:

receive, by an application running on an electronic device, a user request to switch a user interface of the application from a bounded mode to an exclusive mode, wherein the user interface, in the bounded mode, is displayed by a display of the electronic device with user interface elements of the user interface constrained to appear within a boundary at a perceivable location, remote from the display, within a physical environment, wherein the boundary is assigned to the application and defines a portion of the physical environment including the perceivable location, and wherein, in the exclusive mode, the user interface elements of the user interface are movable to locations outside the boundary;

provide, by the application to a system process at the electronic device responsive to the user request, a request to switch the user interface from the bounded mode to the exclusive mode;

receive, by the application, an approval of the switch from the system process; and modify, by the application, at least one user interface element of the user interface elements of the user interface for the exclusive mode.

20. The non-transitory computer-readable medium of claim 19, wherein the instructions, when executed by the one or more processors, cause the one or more processors to modify the at least one user interface element by replacing the at least one user interface element with a controllable user interface element that is moveable to the locations outside the boundary of the bounded mode.

21. The non-transitory computer-readable medium of claim 20, wherein the instructions, when executed by the one or more processors, further cause the one or more processors to:

receive, by the application, a user request to modify the controllable user interface element from a two-dimensional user interface element to a three-dimensional user interface element; and modify, responsive to the user request, the controllable user interface element from the two-dimensional user interface element to the three-dimensional user interface element.

22. The non-transitory computer-readable medium of claim 21, wherein following the switch and prior to the modification of the controllable user interface element, the controllable user interface element is displayed to appear identical to the at least one user interface element in the bounded mode.

23. The non-transitory computer-readable medium of claim 19, wherein, in the exclusive mode, the user interface comprises a full screen mixed reality user interface.

* * * * *